(12) United States Patent
Findlay

(10) Patent No.: US 10,708,291 B2
(45) Date of Patent: Jul. 7, 2020

(54) SECURITY THREAT INFORMATION GATHERING AND INCIDENT REPORTING SYSTEMS AND METHODS

(71) Applicant: Valarie Ann Findlay, Woodlawn (CA)

(72) Inventor: Valarie Ann Findlay, Woodlawn (CA)

(73) Assignee: Valerie Ann Findlay, Woodland (CA)

( * ) Notice: Subject to any disclaimer, the term of this patent is extended or adjusted under 35 U.S.C. 154(b) by 105 days.

(21) Appl. No.: 15/609,599

(22) Filed: May 31, 2017

(65) Prior Publication Data

US 2017/0346846 A1 Nov. 30, 2017

Related U.S. Application Data

(60) Provisional application No. 62/343,300, filed on May 31, 2016.

(51) Int. Cl.
*H04L 29/06* (2006.01)
(52) U.S. Cl.
CPC ...... *H04L 63/1433* (2013.01); *H04L 63/1441* (2013.01)
(58) Field of Classification Search
CPC ............. H04L 63/1433; H04L 63/1441; H04L 29/06904
See application file for complete search history.

(56) References Cited

U.S. PATENT DOCUMENTS

| | | | | |
|---|---|---|---|---|
| 8,132,260 | B1 * | 3/2012 | Mayer | G06F 21/577 726/11 |
| 8,302,196 | B2 * | 10/2012 | Soderberg | G06F 21/577 726/25 |
| 8,495,745 | B1 * | 7/2013 | Schrecker | G06F 21/577 726/25 |
| 8,793,151 | B2 * | 7/2014 | DelZoppo | G06Q 10/0635 705/7.28 |
| 9,438,614 | B2 * | 9/2016 | Herz | G06Q 20/201 |
| 9,798,883 | B1 * | 10/2017 | Gil | H04L 63/1416 |
| 10,185,924 | B1 * | 1/2019 | McClintock | G06Q 10/0635 |
| 2007/0168311 | A1 * | 7/2007 | Genty | G06N 3/02 706/60 |

(Continued)

*Primary Examiner* — Ghodrat Jamshidi
(74) *Attorney, Agent, or Firm* — Daniel J. Chalker; Edwin S. Flores; Chalker Flores, LLP

(57) ABSTRACT

A common misconception equates information with intelligence. To transform information into intelligence a number of analytical steps must occur within a framework designed to yield very specific datum associable with other raw or formulated datum, that provides an answer or solution to a sub-problem. Every organization has threats and risks including cyber threats, threats to infrastructure, etc. that can impact the organization on many levels. However, most organizations do not understand how to quantify and assess these risks/threats yet alone assess different preemptive actions for mitigating impact. It would therefore be beneficial to provide organizations with a software based system that provides threat information gathering, incident reporting, and asset identification/valuation as part of its compounded intelligence and supports predictive context specific analysis of risks and countermeasures. Further, distributed countermeasure monitoring provides incident levels of known and unknown, or yet to be categorized threats.

27 Claims, 29 Drawing Sheets

(56) References Cited

U.S. PATENT DOCUMENTS

| | | | |
|---|---|---|---|
| 2007/0250932 A1* | 10/2007 | Kothari | G06Q 40/08 |
| | | | 726/25 |
| 2014/0380456 A1* | 12/2014 | Demopoulos | H04L 63/0236 |
| | | | 726/11 |
| 2015/0244681 A1* | 8/2015 | Blumenfeld | G06F 16/951 |
| | | | 713/168 |
| 2016/0021133 A1* | 1/2016 | Sher-Jan | H04L 63/1433 |
| | | | 726/25 |
| 2016/0323301 A1* | 11/2016 | Boss | H04L 63/1433 |
| 2017/0187742 A1* | 6/2017 | Rogers | H04L 63/20 |
| 2017/0339150 A1* | 11/2017 | Barsness | H04L 63/102 |

* cited by examiner

| | | | |
|---|---|---|---|
| Organization Operating Country | Country List | Country Risk Rating, External Country Economic Rating, GDP, Stock Exchange, Credit Rating, Interest Rate, Inflation, Exchange Rate | Record Country Risk Rating<br>Record Country Economic Rating<br>Export to TRRD<br>EXT VAR [country risk rating]<br>INT VAR [country economic rating] |
| Organization Operating Region | Region | Regional Economic Rating, GDP, Unemployment Values | Record Region<br>Export to TRRD<br>INT VAR [region economic value]<br>INT VAR [OOR range value / %] |
| Number of Employees | Number range(s) | Range value | Record Country NE range value<br>Record Region NE range value<br>Export to TRRD<br>EXT VAR [country employment value - range /%] |
| Organization Revenue | [list] By Country<br>Number range(s)<br>[list] By Region(s)<br>Number range(s) | Range value | Record range value (s)<br>Client only data<br>INT VAR [country sector economic value - range value / %]<br>INT VAR [region sector economic value - range value / %] |
| Sector | [list] Private or Government<br>[sub-list] Private: Profit/Non-Profit<br>[sub-list] Generic sub-types<br>OR<br>[sub-list] Government: Crown, Federal, Provincial/State, District, Regional,<br>[sub-list] Generic sub-types<br>Decision driven on Operating Country Selection | Range value based on Sector<br>Sensitivity<br>Economic Value<br>Each Sector and Sub-type has an internal variable | Export to TRRD<br>INT VAR [sector sensitivity range value]<br>INT VAR [economic range value] |
| Type of Assessment | [list]<br>Network Security<br>Application Security<br>Physical Security<br>Infrastructure Security<br>Data/Information Security<br>Contracting Security<br>Decision driven to Countermeasures, Assets, Targets and Comprehensive Risk | Select one or many<br>Each selection opens a separate TRAA process record under the Organization record | Export to TRRD |
| Asset Location - Country | Country List<br>External data/Updated | Country Risk Rating, External Country Economic Rating, GDP, Stock Exchange, Credit Rating, Interest Rate, Inflation, Exchange Rate | Record Country Risk Rating<br>Record Country Economic Rating<br>Export to TRRD<br>EXT VAR [country risk rating]<br>INT VAR [country economic rating] |
| Asset Location - Region | [list]<br>Region<br>External data/Updated<br>Select one or more; Creates region sub-process<br>Decision driven on Country Selection | Regional Economic Rating; GDP, Unemployment Values | Record Region<br>Export to TRRD<br>INT VAR [region economic value]<br>INT VAR [OOR range value / %] |
| Asset Type | [list] System/Service<br>[sub-list] Internal, External<br>[sub-list] Infrastructure | Select one | Record Asset and sub-types<br>Export to TRRD |
| | Device - device list<br>Data/Information<br>... | Select one or many | |
| | [list]<br>Product<br>Data/Information<br>[sub-list] Generic sub-types<br>... | Select one or many | INT VAR [asset risk/value calculated from gross asset cost before current state/countermeasures are applied] |
| | [list]<br>Human<br>[sub-list]<br>Employee<br>Public | Select one or many | |
| | [sub-list]<br>Number range<br>Decision driven to Countermeasures, Assets, Targets and Comprehensive Risk | | |

Figure 5

| | | | |
|---|---|---|---|
| Asset Market(s) | [list]<br>Markets by Private/Public<br>Enter Market Share (%)<br>Decision-driven by Sector Selection | Select one or many | Record selection<br>Record Share<br>Export to TRRD |
| Asset Market Segment(s) | [list]<br>Market Segments by Market List and Private/Public<br>Enter Market Segments Share (%)<br>Decision-driven by Market Selection | Select one or many | Record selection<br>Record Share<br>Export to TRRD |
| Number of Employees at Designated Location | Number range(s)<br>Select one<br>Decision-driven to Countermeasures, Assets, Targets and Comprehensive Risk if deemed Asset | Range value | Record range<br>Export to TRRD<br>INT VAR: Number range rated by density |
| Organization Customer Base | Number range<br>Organization customer total number | Range value | Record range<br>Export to TRRD |
| | [Enter text]<br>Percentage of Critical Product/Service | Text | Record value |
| | [Enter text]<br>Percentage of Government Contracts | Text | |
| | | Revenue (OR) - | Output Values |
| | | Net asset value (NAV) - Numerical/Dollars | Organizational Value |
| | | Net worth (NW) - Numerical/Dollars | Organizational Influence |
| | | Number of employees by operating country (nNEC) - Numerical | Service/Product Influence |
| | | Number of employees by region (nNER) - Numerical | |
| | | Total number of employees (TNE) - Numerical | |
| Asset State | [list]<br>Static, In Transit, In Use, and/or In Storage | State Risk Value<br>Recognizing that the less control the higher the associated risk to the state | Record selection<br>Export to TRRD |
| Asset Type | [list]<br>Product/Service<br>[list]<br>Internal/External<br>[list]<br>Tangible/Intangible<br>[sub-list]<br>Information (refined or unrefined content as document or diagram)<br>Data (operational code, configuration values, schematics, etc.)<br>Device/Equipment, Product or Service | Select one or many | Record selection<br>Export to TRRD |
| Asset Classification | [list]<br>unclassified/public or classified<br>[sub-lists]<br>The more an asset is replicated or shared and the less control over replication there is (control over versions, patents, copyrighting, etc.) the less valuable the asset | Select one | Client only data |
| Asset Owner | [list]<br>Owner/Custodian/End User | Select one | Client only data |
| Asset Hardening/Countermeasures | [list]<br>Countermeasures<br>[sub-list]<br>Second Level Countermeasures Techologies, Sageguards, Policies, Processes, Procedures and Resources<br>The more types and sub-types involved the higher the hardening rating<br>Type and Sub-Type Ranges. | Select one of many | Client only data |
| Asset Actual Value | Number range(s) | Range value | Record range<br>Export to TRRD |
| Asset Replacement Actual | Number range(s) | Range value | Record range<br>Export to TRRD |
| Asset Inferred or Soft Va | [list]<br>Value<br>[list]<br>Number range(s) | Range value | Record range<br>Export to TRRD |

Figure 6

| | | | |
|---|---|---|---|
| Target Hardening/Countermeasures | {list} | Select one of many | Client only data |
| | Countermeasures | | |
| | {sub-list} | | |
| | Second Level Countermeasures Techologies, Sageguards, Policies, Processes, Procedures and Resources | | |
| | The more types and sub-types involved the higher the hardening rating | | |
| | Type and Sub-Type Ranges. | | |
| Target Actual Value | Number range(s) | Range value | Record range |
| | | | Export to TRRD |
| Target Replacement Actual Cost | Number range(s) | Range value | Record range |
| | | | Export to TRRD |
| Target Inferred or Soft Value | {list} | Range value | Record range |
| | Value | | |
| | {list} | | Export to TRRD |
| | Number range(s) | | |
| | Factors: | | Output Values |
| | Asset Primary and Secondary Value - The value associated to a secondary or dependant entity, such as a partner or intermediary - Numerical; Range. | | Asset Characteristics and Influence |
| | | | Target Characteristics, Value and Cost |
| | Target Primary and Secondary Value - The value associated to a secondary or dependant entity, such as a partner or intermediary - Numerical; Range. | | Asset Value and Impact Cost |
| Countermeasures | {list} | Select one of many | Record inputs |
| | Countermeasures | | Client only data |
| | {sub-list} | | INT VAR (countermeasure * associated selections * instances = asset security rating, target security rating, current state rating) |
| | Second level Countermeasures | | |
| | {associated selections} | Frequency | |
| | • | Action Process | |
| | • | Priority | Decision-driven to Comprehensive |
| | • | Assigned/Unassigned | |
| | • | Known Unresolved Actions | Risk Assessment |
| | Technologies, Sageguards, Policies, Processes, Procedures and Resources | | |
| | The more types and sub-types involved the higher the hardening rating | | |
| | Type and Sub-Type Ranges. | | |
| | Factors: | | Outputs: |
| | Countermeasures selection, association and complexity of application | | Asset security rating, |
| | | | Target security rating |
| | | | Current state security rating |
| Asset/Target Threat | {list} | | |
| Scenarios | Theft | Individual asset types and/or targets, and are defined and demonstrated to rate the risk to the organization and possibly to partners and intermediaries. | |
| | Modification | | |
| | Disruption | | |
| | Destruction | | |
| | PROPRIETARY RATINGS | | |
| | Calculated based on Threat Domains Assessment, Threat Vector Assessment and Economic Risk Assessment ratings to provide an output valuation of the Threat Scenario Profile. | | |

Figure 7

| | | | | |
|---|---|---|---|---|
| Threat Domain(s) Assessment | PROPRIETARY RATINGS | Each scenario is devised for individual asset types and/or targets, and are defined and demonstrated to rate the risk to the organization and possibly to partners and intermediaries | | |
| Threat Vector Assessment | PROPRIETARY RATINGS | Vectors are assembled based on the domains and the asset types and/or targets, and are defined and demonstrated to rate the risk to the organization and possibly to partners and intermediaries | | |
| | Factors: | Outputs: | | |
| | | Theft Scenario Rating | | |
| | Threat Scenarios | Modification Scenario Rating | | |
| | Threat Domain Assessment | Disruption Scenario Rating | | |
| | Threat Vector Assessment | Destruction Scenario Rating | | |
| | | Threat Domains Rating | | |
| | | Threat Vector Rating | | |
| | | Final Output: Threat Scenario Profile Rating | | |
| Economic Risk Assessment | PROPRIETARY RATINGS | | | |
| | Calculated based on assessment from the Organization Profile (Organizational Value, Organizational Influence and Service/Product Influence) as applied to the Environment Current State, Asset and Target Profile and Threat Scenario valuations; this is examined and stated as primary, secondary and tertiary impacts | | | |
| Competitive Risk Assessm | PROPRIETARY RATINGS | | | |
| | Calculated based on assessment from the Organization Profile (Organizational Value, Organizational Influence and Service/Product Influence) as applied to the Environment Current State, Asset and Target Profile and Threat Scenario valuations; this is examined and stated as primary, secondary and tertiary impacts | | | |
| Harm Risk Assessment | PROPRIETARY RATINGS | | | |
| | Calculated based on assessment from the Organization Profile (Organizational Value, Organizational Influence and Service/Product Influence) as applied to the Environment Current State, Asset and Target Profile and Threat Scenario valuations; this is examined and stated as primary, secondary and tertiary impacts | | | |
| Liability Risk Assessment | PROPRIETARY RATINGS | | | Outputs: |
| | Calculated based on assessment from the Organization Profile (Organizational Value, Organizational Influence and Service/Product Influence) as applied to the Environment Current State, Asset and Threat Profile and Threat Scenario valuations; this is examined and stated as primary, secondary and tertiary impacts | | | Economic Risk Assessment |
| | | | | Competitive Risk Assessment |
| | | | | Harm Risk Assessment |
| | | | | Liability Risk Assessment |
| | | | | Residual Risks Summary |
| | | | | Detailed Recommendations |

Figure 8

TIGIR: Threat Information Gathering and Incident Response
Threat Risk Analysis and Assessment (TRAA)

[Logout]

Profile Help

Organization Profile 1/1

1. Organization Name
2. Organization Legal Name
3. Organization Operating Country
4. Organization Operating Region
5. Organization Operating Sub Region
6. Organization Entity Sector
7. Organization Entity Sub Sector
8. ○ Product ● Service
9. Organization Economic Sector
10. Product / Service Type

[Clear]   [Create Profile]

TIGIR: Threat Information Gathering and Incident Response
Threat Risk Analysis and Assessment (TRAA)

Logout

Profile Help

Organization TRAA Profile 1/1

10. Threat Risk Analysis and Assessment Name
11. Threat Risk Analysis and Assessment Scope/Focus
12. Threat Risk Analysis and Assessment Domain(s)

- ☑ Network Security
- ☐ Physical Security
- ☑ Data/Information Security
- ☐ Device Security
- ☑ Application Security
- ☐ Infrastructure Security
- ☐ Resource Screening Security
- ☐ Conducting Third Party Security 13. Threat risk Analysis and Assessment Purpose

- ○ Audit Assessment
- ● Acquisition Assessment
- ○ Update/Change Assessment

14. Asset Type
15. Asset Use
16. Asset LOB

○ Internal  ● External

Add Asset

Back    Clear    Create Record

Fig. 10 (Continued)

1150 (Continued)

TIGIR: Threat Information Gathering and Incident Response
Threat Risk Analysis and Assessment (TRAA)

Confidentiality (decision based asset type)
Asset Type [ ]　　Sub Type [ ]

10. Sensitivity [ ]

11. Rating [ ]

12. Impact Ratings
    Impact to ability to deliver products / services, etc.
    Impact to business units
    Impact to stakeholders
    Impact to external partners, third party, etc.
    Impact to reputation and/or trust:
        Stakeholders
        Public
    Regulatory, legal or contractual impact
    Impact to employees
    Impact to public/individuals
    Impact to human safety

[ Add ]

13. Notes [ ]　　Clear　　[ Add to Record ]

[ Back ]

TIGIR: Threat Information Gathering and Incident Response
Threat Risk Analysis and Assessment (TRAA)

Profile Help                                                                 Logout

Foundational Profile – Statement of Sensitivity 4/4

Asset – Name
Asset – Internal / External
LOB
Stakeholder Type
Stakeholder Type
Availability (decision based Asset Type)
Asset Type                Sub Type
Sensitivity               Rating
Confidentiality Rating
Integrity Rating
Availability Rating
1. Impact Ratings
Impact to reputation and/or trust
    Business units
    Stakeholders
    External partners, third party, etc.
    Public
Regulatory, legal or contractual impact
Impact to employee safety
Impact to public safety
Impact to public resources Clear     Add Add to Record

2. Notes

Back

Fig. 12 (Continued)

TIGIR: Threat Information Gathering and Incident Response
Threat Risk Analysis and Assessment (TRAA)

1300

[Profile Help]  [Logout]

Foundational Profile – Statement of Sensitivity Summary

Asset – Name
Asset – Internal / External
LOB
Stakeholder Type
Stakeholder Type

Asset Valuation Asset
Type                    Sub Type
Sensitivity             Rating
Confidentiality Rating
Integrity Rating
Availability Rating
Macro and Liability Rating

RTC

Asset Disbursement - Percentage
Confidentiality     %   %   %   %   %
Integrity           %   %   %   %   %
Availability        %   %   %   %   %
Harm and Liability  %   %   %   %   %

[Back]        [Add to Record]  [New Asset]  [Asset Target Profile]

TIGIR: Threat Information Gathering and Incident Response
Threat Risk Analysis and Assessment (TRAA)

Profile Help                                                                 Logout

Asset and Target Profile – Asset: Evidence
Asset- Name Asset entry TRAA Profile #14          Asset – Internal/External Asset Entry TRAA Profile #15
Asset Type   Asset entry TRAA Profile #14         LOB Asset entry TRAA Profile #16

Stakeholder   Stakeholder/Type Sub-Type SOS 1 #1-5+
… Next Stakeholder (Name)

Target – Name Decision- based / from Asset Profile #2     Sub Type
Target Type
Total Target ( Name) Valuation/Replacement Cost Asset Profile #8

1. Evidence Type         ☐ Direct/Scene/Site    ☐ Supporting Evidence  ☐
2. Evidence Ownership
3. Evidence Custodian                              [Add]
4. Work Unit
5. Crime Category
6. Meta Data
7. Evidence Control and Custody
    ☐ Item Description              ☐ Collectors Name
    ☐ Case Number/Identifier        ☐ Collectors Identifier
    ☐ Date of collection            ☐ Brand/Serial Number/Item Information
    ☐ Location of Collection
8. Preventative Control Categories
    ☐ Loss             ☐ Modification       ☐ Deterioration      ☐ Destruction
9. Security Control Categories
    ☐ Electronic       ☐ Data               ☐ Physical                    [Add]
    ☐ Infrastructure   ☐ Resource Access    ☐ Policy/Procedure Fig. 13 (Continued)

TIGIR: Threat Information Gathering and Incident Response
Threat Risk Analysis and Assessment (TRAA)

1350 (Continued)

Profile Help                                                                 Logout Evidence Management ☐ Use/Access Requirements          ☐ Storage/Physical Requirements
☐ Transport Requirements-Handling  ☐ Retrieval and Precaution
☐ Disposal Harm/Contamination Add Clear All        Add to Record Back Fig. 13 (Continued)

1400

Preventative Control Category - Modification
Evidence Management
User/Access Requirements
Storage/Physical Containment Requirements
Transport Requirements-Handling
Retrieval and Precaution
Disposal Harm/Contamination

Preventative Control Category - Deterioration
Evidence Management
User/Access Requirements
Storage/Physical Containment Requirements
Transport Requirements-Handling
Retrieval and Precaution
Disposal Harm/Contamination

Preventative Control Category - Destruction
Evidence Management
User/Access Requirements
Storage/Physical Containment Requirements
Transport Requirements-Handling
Retrieval and Precaution
Disposal Harm/Contamination Back Clear All Add to Record

TIGIR: Threat Information Gathering and Incident Response
Threat Risk Analysis and Assessment (TRAA)

TIGIR

Logout

Profile Help

Asset and Target Profile – Asset: Evidence Entry

Asset- Name       Asset – Internal/External
Asset Type       LOB

Stakeholder   Stakeholder/Type Sub-Type
... Next Stakeholder (Name)

Target – Name
Target Type       Sub Type
Total Target ( Name) Valuation/Replacement Cost
  ..Next Target (Name)

Evidence Type
Evidence Ownership
Evidence Custodian
Work Unit
Crime Category
Preventative Control Categories
Security Control Categories

SHOW/HIDE

TIGIR: Threat information Gathering and Incident Response
Threat Risk Analysis and Assessment (TRAA)

Profile Help                                                          Logout

Evidence Control and Custoday

Case Description

Case Number/Identifier

Date of Collection

Location of Collection

Collector's Name

Collector's Identifier

Number                                                          Add

Preventative Control Category - Loss
Evidence Management
User/Access Requirements
Storage/Physical Containment
Requirements
Transport Requirements-Handling
Retrieval and Precaution
Disposal Harm/Contamination ☐ ☐  ☐ ☐ ☐
          Add Fig. 14 (Continued)

1550

Profile Help

TIGIR: Threat Information Gathering and Incident Response
Threat Risk Analysis and Assessment (TRAA)

Logout

Asset and Target Profile – Target Valuation 2/3

Target - Name

Target Type                                          Sub-Type

Current Investment
1. Target Initial Cost                    2. Depreciation (%)
3. Initial Implementation/Resource Cost
4. Investment Total Replacement Cost
5. Replacement Cost                       6. Implementation/Resource Cost
7. Replacement Cost Total Total Target (Name) Valuation/Cost
8. Total ...next Target Back                                      Clear          Add New Target Clear All     Add to Record Fig. 15 (Continued)

1600

TIGIR: Threat Information Gathering and Incident Response
Threat Risk Analysis and Assessment (TRAA)

Profile Help                                                                                    Logout

Asset and Target Profile – Asset Valuation 2/3

Asset- Name                          Asset Internal/External
Asset Type                           LOB
Stakeholder
..Next Stakeholder
Target - Name
Target Type                          Sub-Type
Total Target Valuation/Replacement Cost
..Next Target [Name]

SHOW/HIDE

Asset [Name] Valuation
Organizational Revenues
Sector                               LOB                        LOB Market
LOB Market Share                     LOB % Sales/Organization Revenues
Economic %/GDP                       Sales % Contracts Stakeholder [Name]       Rating      Impact Value                      Add
Sensitivity                                                            Add
Confidentiality                                                        Add
Integrity                                                              Add
Availability                                                           Add
Harm and Liability                                                     Add
              Total Impact Value                         Clear All    Add to Record Back

TIGIR: Threat Information Gathering and Incident Response
Threat Risk Analysis and Assessment (TRAA)

Logout

Profile Help

Asset and Target Summary

Asset- Name
Asset Type
Asset Valuation
 Organizational Revenues
 Sector
 LOB Market Share %
 Economic % / GDP Asset Internal/External
LOB LOB                          LOB Market
LOB % Sales/Organization Revenues
Sales % Contracts Stakeholder [Name]

Rating        Impact Value

Sensitivity
Confidentiality
Integrity Rating
Availability
Harm and Liability
      Total Impact Value ..Next Stakeholder
Target Name
Target Type
Total Target Valuation/Replacement Cost
..Next Target [Name]

Back

Add to Record

Profile

Fig. 16 (Continued)

SECURITY THREAT INFORMATION GATHERING AND INCIDENT REPORTING SYSTEMS AND METHODS

CROSS-REFERENCE TO RELATED APPLICATIONS

This patent application claims the benefit of U.S. Provisional Patent Application 62/343,300 filed May 31, 2016 entitled "Security Threat Information Gathering and Incident Reporting Systems and Methods", the contents of which are incorporated herein by reference.

FIELD OF THE INVENTION

This invention relates to security and more particularly to threat information gathering, threat risk assessment, threat risk analysis, incident reporting, and information classification, codifying and sharing.

BACKGROUND OF THE INVENTION

Computer security, also known as cybersecurity or IT security, relates to the protection of information systems from theft or damage to the hardware, the software, and to the information on them, as well as from disruption or misdirection of the services they provide. Cyber security includes controlling physical access to the hardware, as well as protecting against harm that may come via network access, data and code injection, and due to malpractice by operators, whether intentional, accidental, or due to them being tricked into deviating from secure procedures.

With the rapid evolution of computer systems, global networks, consumer electronics etc. over the past 30 years the field is extremely important in today's society through their integration into every aspect of our lives, from local to national security, manufacturing, banking, and personal. The recent growth of "smart" devices, including smartphones, televisions, wearable devices, smart sensors, etc. as part of the Internet of Things has meant that businesses where they were once worried about a small number of relatively large computers with a small number of software applications must now consider a large number of small, highly portable devices, with multiple wireless interfaces and potentially large numbers of software applications even without considering specific attacks (e.g. hacking, denial of service) and general attacks (e.g. viruses which propagate to millions of electronic devices).

Security generally has been in a prolonged transition stage, where for decades the security industry and users have been using the same threat risk methodologies and the same means to calculate impacts and costs associated with the loss, disruption, damage and sabotage to IT systems as well as others. With cyber security though we have seen threats not only evolve in their technological sophistication but also in their asymmetry, where they now leverage various domains, for example social engineering for information, physical security, access credentials, data manipulation, and technology to meet their agenda.

Currently, much of the data gathering from security breaches stops short of analysis, little intelligence is collected, even less is shared and most countermeasures rely heavily on technological solutions and specialized resources and contractors. If we look back to the advent of web development in the mid-1990s, which was driven developers and the IT industry, security is very much at the same stage. It didn't take long to recognize that in order for the capabilities of the web to meet business and service needs the application layer had to evolve—functions and interfaces required human behaviour and business analysis to improve usability, thereby enhancing market value, revenues and ROI. The flat one-to-one functions of Web 1.0 led to Web 2.0 with its meta-data, folksonomy, personalization, social interaction and collaboration and web media. As Web 3.0 continues to evolve, computational behaviours emerge, such as machine-to-machine learning, anticipatory intelligence, enhanced data-to-data context—replacing document to document relationships—and of course the Internet of Things.

The inventors believe that the security industry in general and the cyber security industry in particular is about to experience a similar transformation, especially in the area of threat risk assessment in two of its most untapped offerings: analysis and intelligence. Detailed and comprehensive analysis of security data allows for a deeper and broader understanding of the impacts and costs associated asset breaches to the organization, market, sector and economies, management of target vulnerabilities on an ongoing basis, consideration of countermeasures from all domains as they make up the current state, true residual risk and the ability to modify and adjust the security posture easily as the threat and technological landscape changes.

It is a common misconception that information is intelligence: in order to transform information into intelligence a number of analytical steps must occur within a framework designed to yield very specific datum that can be associated to other raw or formulated datum, that provides an answer or solution to a sub-problem. Much of this will be accomplished through the re-categorization, elaboration and causal association of terms that are specific to the defined profiles of data required in the threat risk process—this is where compounding of intelligence allows for historical experiences and outcomes to identify threat characteristics. This representative of the Web 1.0 to 2.0 transition and the next phase will follow that of Web 3.0, where advanced, compounded intelligence is derived from similar computational processes that have matured.

Accordingly, the inventors believe that it would be beneficial to provide for those addressing cyber security to exploit a software system that provides threat information gathering and incident reporting as its compounded intelligence moves from identification to predictive and forecasting contexts. It would be beneficial for the cyber security industry to access and exploit a software system that with enough reliable cycles of compounded intelligence a variety of communication and collaboration functions are facilitated for stakeholders across different sectors and that data collected from countermeasure monitoring provides levels of incident and prevalence of known and unknown, or yet to be categorized, threats.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to security and more particularly to threat information gathering, threat risk assessment, threat risk analysis, incident reporting, and information classification, codifying and sharing.

In accordance with an embodiment of the invention there is provided a system comprising a first module allowing a user to establish in respect of one or more activities of an enterprise incorporating at least one of electronic devices and communications networks a threat risk assessment and analysis (TRAA) with respect to one or more attacks, and a second module allowing the user to access information relating to at least one of threat reporting and security responses in respect of one or more attacks.

In accordance with an embodiment of the invention there is provided a Threat Information Gathering and Incident Reporting (TIGIR) system comprising threat-risk and reporting software systems to address limitations present within current security methodologies and solutions enacted by an enterprise, wherein the TIGIR exploits an algorithm to establish at least one of a risk, a first cost associated with the risk, and a second cost associated with mitigating the risk.

In accordance with an embodiment of the invention there is provided a Threat Information Gathering and Incident Reporting (TIGIR) system comprising threat-risk and reporting software systems to address limitations present within current security methodologies and solutions enacted by a user, wherein the TIGIR exploits an algorithm to provide at least one of:
- a current state assessment relating to security countermeasures undertaken by the user;
- a dynamic report relating to a security posture of the user;
- a risk rating by profile relating to countermeasures and securitization of an asset associated with the user; and
- a recommendation relating to increasing a security position of the user.

In accordance with an embodiment of the invention there is provided a Threat Information Gathering and Incident Reporting (TIGIR) system comprising threat-risk and reporting software systems to address limitations present within current security methodologies and solutions enacted by an enterprise with respect to one or more security domains, wherein
the TIGIR exploits first data relating to the user's assets, second data relating to the enterprise's security methodologies and solutions, third data relating to third party security methodologies and solutions and one or more algorithms to provide at least one of:
a user value and economic impact analysis to an enterprise's market, sector, operating country and regional levels in the event of a security breach towards the enterprise's asset(s);
provide risk analysis of an enterprise's current security posture from assessment of operationalized countermeasures as defined by at least one of policies, processes, resources and technological safeguards together with a vulnerabilities gap analysis of the enterprise's security;
identify residual risk and recommendations to reduce enterprise exposure and provide increased security within the one or more security domains;
collect internal, external and client-reported threat data and perform compound analysis of internal, external and client-reported threat data using detailed threat characteristics to enhance threat identification and distributed threat mitigation;
real-time reporting of sector and platform-specific security intelligence; and
data for anticipatory logic and predictive intelligence relating to at least one of threats, countermeasures, and capture analysis of technological safeguard effectiveness.

In accordance with an embodiment of the invention there is provided a Threat Risk Assessment and Analysis (TRAA) system for providing a higher level of cyber security on IT infrastructure, networks, systems and devices with through comprehensive, cyber-appropriate threat/risk assessment and in depth analysis.

In accordance with an embodiment of the invention there is provided a Threat Reporting and Response Database (TRRD) system for providing secure, encrypted data gathering from external sources and client incident data resulting in compounded intelligence and real-time reporting of sector and domain specific cyber threats to enhance client communication and collaboration allowing for immediate responses to new threats.

In accordance with an embodiment of the invention there is provided a Threat Information Gathering and Incident Reporting (TIGIR) system providing threat-risk and reporting software in respect of security methodologies and solutions by providing: communications and collaboration among internal and external stakeholders to communicate threats and specific characteristics;
a higher level of cyber security on IT infrastructure, networks, systems and devices with through comprehensive, cyber-appropriate threat/risk assessment and in depth analysis; and
compounded intelligence and real-time reporting of sector and platform-specific security threats to enhance client communication and collaboration allowing for immediate responses to new threats.

In accordance with an embodiment of the invention there is provided a Threat Information Gathering and Incident Reporting (TIGIR) system providing threat-risk assessment and a risk mitigation solution with respect to assets of a user within one or more security domains of the user, wherein
the one or more security domains selected from the group comprising network security, application security, physical security, infrastructure security, data/information security, contracting and vendor security; and
the risk mitigation solution is the solution applies to all of the assets of the user but is centered upon cyber security through application of constructions to one or more layers selected from the group comprising physical layer, data link layer, network layer, transport layer, session layer, presentation layer and application layer.

In accordance with an embodiment of the invention there is provided Threat Information Gathering and Incident Reporting (TIGIR) system providing threat-risk assessment and a risk mitigation solution with respect to assets of a user within one or more security domains of the user comprising:
a Threat Risk Assessment and Analysis (TRAA) system for providing a higher level of cyber security on IT infrastructure, networks, systems and devices with through comprehensive, cyber-appropriate threat/risk assessment and in depth analysis of an organization's current state and identifies cyber security gaps by analysing data gathered with respect to one or more profiles; wherein
the one or more profiles are selected from the group comprising an organization profile, a target and asset profile, an environment current state (countermeasure) profile, a threat scenario profile, and a residual risks and recommendations profile; and
a Threat Reporting and Response Database (TRRD) system for providing secure, encrypted data gathering from external sources and client incident data resulting in compounded intelligence and real-time reporting of sector and domain specific cyber threats to enhance client communication and collaboration allowing for immediate responses to new threat by at least one of:

gathering and compound analysing internal, external and client-reported threat data using detailed threat characteristics to support open-source communication and collaboration and threat identification;

real-time reporting of sector and platform-specific cyber intelligence allowing faster response to new threats;

allowing queries on historical data and established data elements established from threat characteristics;

foundation for anticipatory logic and predictive intelligence on threats and countermeasures and log analysis of technological safeguard effectiveness; and collection and analysis of data from safeguards to monitor and measure effectiveness.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 5 to 8 depict an exemplary data dictionary structure for the Threat Risk Assessment and Analysis component of the TIGIR system according to an embodiment of the invention;

FIGS. 13 and 14 depict exemplary web forms for a TIGIR system according to an embodiment of the invention relating to a summary statement of sensitivity and entry of asset evidence for an asset and target profile; and FIGS. 15 and 16 depict exemplary web forms for a TIGIR system according to an embodiment of the invention relating to asset and target profile; asset valuation; and asset summary.

DETAILED DESCRIPTION

Figure 1:
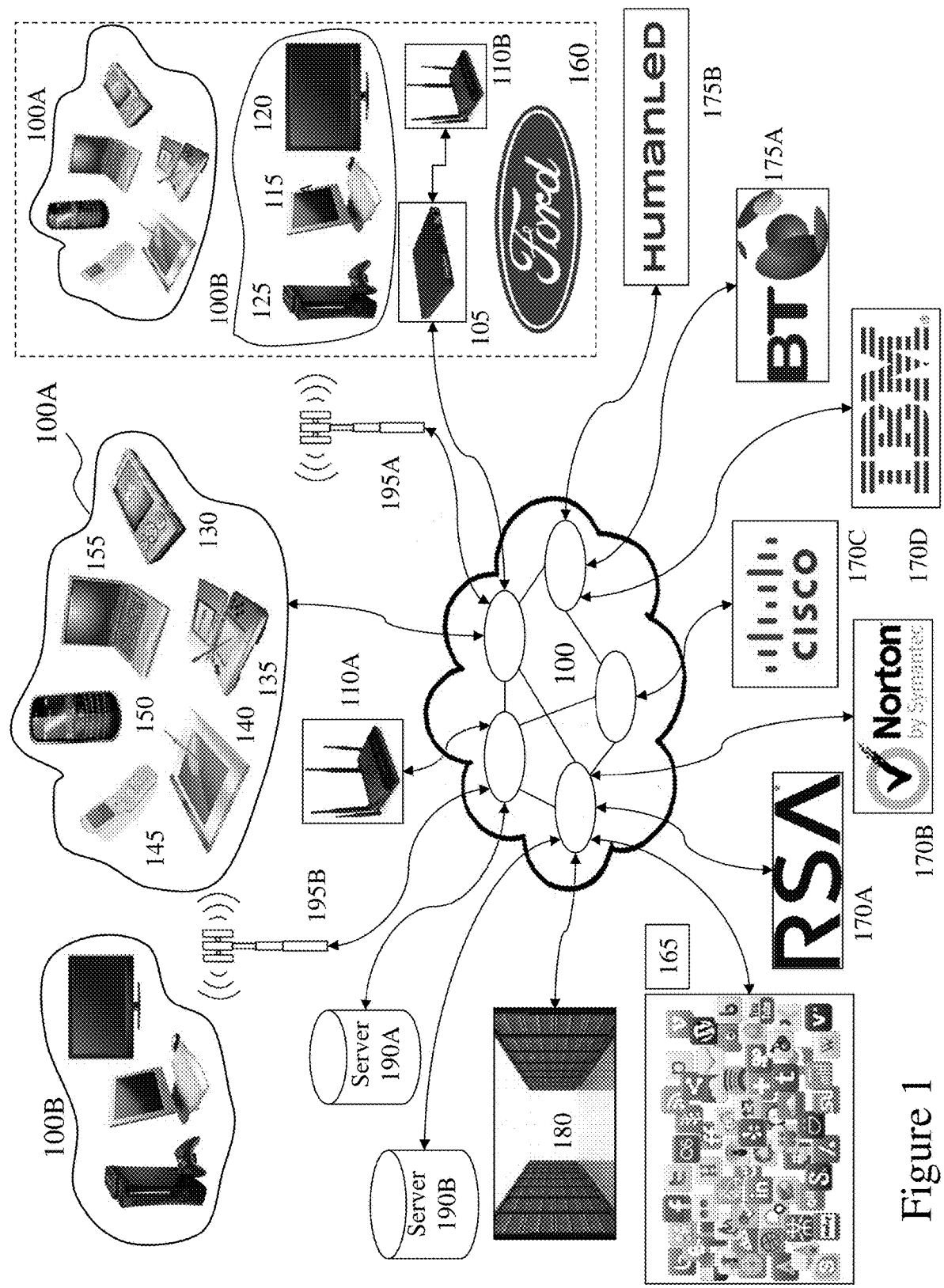
FIG. 1 depicts a network environment within which embodiments of the invention may be employed.

The present invention is directed to security and more particularly to threat information gathering, threat risk assessment, threat risk analysis, incident reporting, and information classification, codifying and sharing.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users. Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion™); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of community organizations, members of charity organizations, men, women and children. In its broadest sense the user may further include, but not be limited to, software systems, mechanical systems, robotic systems, android systems, etc. that may be characterised by an ability to exploit one or more embodiments of the invention. A user may be associated with biometric data which may be, but not limited to, monitored, acquired, stored, transmitted, processed and analysed either locally or remotely to the user. A user may also be associated through one or more accounts and/or profiles with one or more of a service provider, third party provider, enterprise, social network, social media etc. via a dashboard, web service, website, software plug-in, software application, and graphical user interface.

"User information" as used herein may refer to, but is not limited to, user behavior information and/or user profile information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein may refer to, but is not limited to, stored data, active data, computer readable data, machine readable data, microprocessor readable data relating to a problem, situation, issue, event or other aspect of a user and/or enterprise.

"Security" as used herein may refer to, but is not limited to, a form of protection creating a separation between an asset and a direct or indirect threat to said asset. Security may therefore include, but not be limited to, cyber-security, network security, application security, physical security; infrastructure security; data/information security; and contracting security.

An "asset" as used herein may refer to, but is not limited to, any tangible or intangible element associated with a user. This may include, but not be limited to, equipment, gear, chemicals, people, physical infrastructure, and financial instruments. This may include, but not be limited, with respect to cyber-security, network security, application security and infrastructure security any data, digitally rendered information, physically rendered information, content, code, memory data, configuration files, passwords, security credentials relating to use, transit, storage of such assets within one or more layers of any conceptual model applied including the Open Systems Interconnection model (OSI model).

A "vulnerability" as used herein may refer to, but is not limited to, a system susceptibility of flaw with may provide a third-party with unauthorised access to, typically. the computer system, data stored upon the computer system, and data accessible in other storage locations and/or computer systems via the computer system. Vulnerabilities within computer systems may include, but are not limited to, backdoors, denial-of-service, distributed denial of service, direct-access attacks, eavesdropping, spoofing, tampering, privilege escalation, phishing, clickjacking, and social engineering.

A "computer virus" as used herein may refer to, but is not limited to, malware that, when executed, replicates itself by reproducing itself or infecting other software programs by modifying them.

A: Environment

Referring to FIG. 1 there is depicted a network environment 100 within which embodiments of the invention may be employed supporting planning systems and planning applications/platforms (DAPs) according to embodiments of the invention. Such DAPs, for example supporting multiple channels and dynamic content. As shown first and second user groups 100A and 100B respectively interface to a telecommunications network 100. Within the representative telecommunication architecture, a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160, e.g. Ford™, within which other first and second user groups 100A and 100B are present. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.10, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 and Bluetooth as well in an ad-hoc manner.

Also connected to the network 100 are:
Social Networks (SOCNETS) 165;
first and second security software providers 170A and 170B respectively, e.g. RSA™ and Norton™;
first and second computer system and computer security system suppliers 170C and 170D, e.g. Cisco™ and IBM™; and
first to second online cybersecurity service providers 175A and 175B respectively, e.g. BT™ and HumanLed™; and
first and second servers 190A and 190B together with others, not shown for clarity.

First and second servers 190A and 190B may host according to embodiments of the inventions multiple services associated with a provider of database applications/platforms (DAPs); a provider of a SOCNET or Social Media (SOME) exploiting DAP features; a provider of a SOCNET and/or SOME not exploiting DAP features; a provider of services to PEDS and/or FEDS; a provider of one or more aspects of wired and/or wireless communications; an Enterprise 160 exploiting DAP features; license databases; content databases; image databases; content libraries; customer databases; websites; and software applications for download to or access by FEDs and/or PEDs exploiting and/or hosting DAP features. First and second primary content servers 190A and 190B may also host for example other Internet services such as a search engine, financial services, third party applications and other Internet based services.

Accordingly, a user may exploit a PED and/or FED within an Enterprise 160, for example, and access one of the first or second primary content servers 190A and 190B respectively to perform an operation such as accessing/downloading an application which provides DAP features according to embodiments of the invention; execute an application already installed providing DAP features; execute a web based application providing DAP features; or access content. Similarly, a user may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 2:
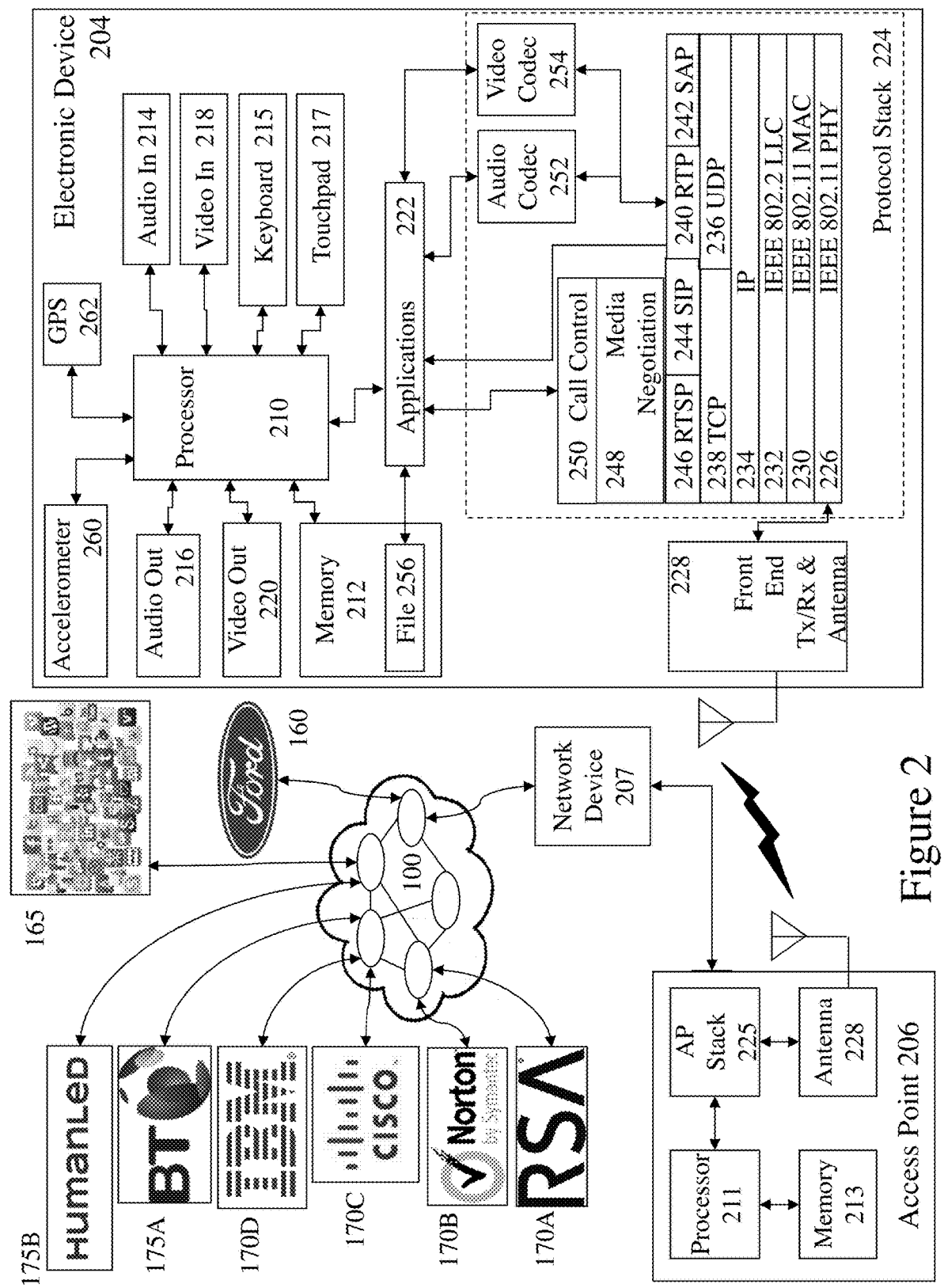
FIG. 2 depicts a wireless electronic device supporting communications to a network such as depicted in FIG. 1 and as supporting embodiments of the invention.

Now referring to FIG. 2 there is depicted an electronic device 204 and network access point 207 supporting DAP features according to embodiments of the invention. Electronic device 204 may, for example, be a PED and/or FED and may include additional elements above and beyond those described and depicted. Also depicted within the electronic device 204 is the protocol architecture as part of a simplified functional diagram of a system 200 that includes an electronic device 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Network devices 207 are coupled to network 100 and therein Social Networks (SOCNETS) 165, first and second software providers 170A and 170B respectively, e.g. RSA™ and Norton™, first and second suppliers 170C and 170D, e.g. Cisco™ and IBM™, and first to second online service providers 175A and 175B respectively, e.g. BT™ and HumanLed™, as well as first and second servers 190A and 190B.

The electronic device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, nonvolatile random access memory devices (NVRAM), SDRAM, DRAM, double data rate (DDR) memory devices, SRAM, universal serial bus (USB) removable memory, and the like.

Electronic device 204 may include an audio input element 214, for example a microphone, and an audio output element 216, for example, a speaker, coupled to any of processors 210. Electronic device 204 may include a video input element 218, for example, a video camera or camera, and a video output element 220, for example an LCD display, coupled to any of processors 210. Electronic device 204 also includes a keyboard 215 and touchpad 217 which may for example be a physical keyboard and touchpad allowing the user to enter content or select functions within one of more applications 222. Alternatively, the keyboard 215 and touchpad 217 may be predetermined regions of a touch sensitive element forming part of the display within the electronic device 204. The one or more applications 222 that are typically stored in memory 212 and are executable by any combination of processors 210. Electronic device 204 also includes accelerometer 260 providing three-dimensional motion input to the process 210 and GPS 262 which provides geographical location information to processor 210.

Electronic device 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise, AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Front-End Tx/Rx & Antenna 21, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the electronic device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.10, IMT-1000, DSL, Dial-Up, DOCSIS, Ethernet, G.hn, ISDN, MoCA, PON, and Power line communication (PLC).

B: Threat Information Gathering and Incident Reporting

Figure 3A:
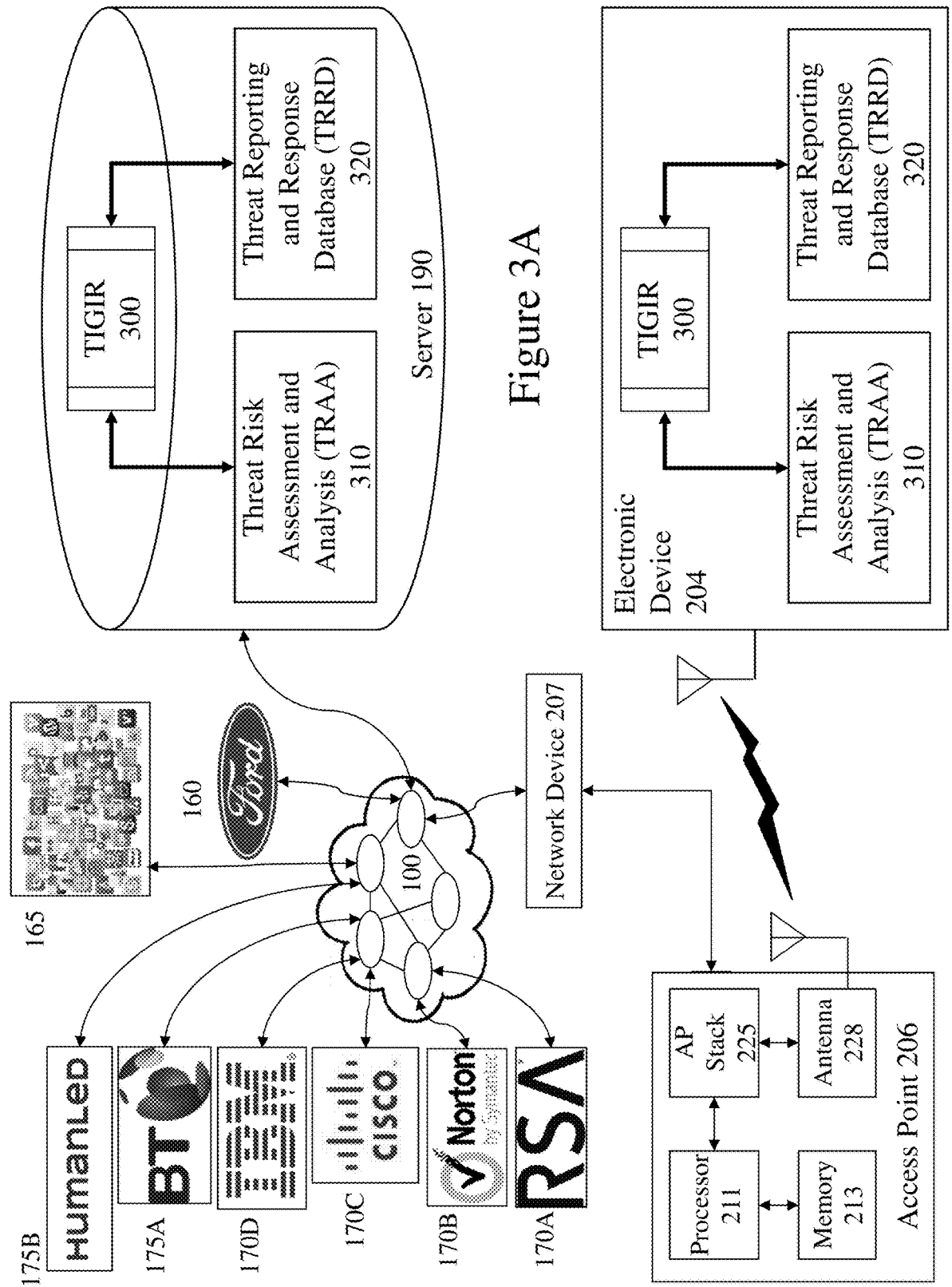
FIG. 3A depicts the dual component architecture of a Threat Information Gathering and Incident Reporting (TIGIR) system according to an embodiment of the invention.

Now referring to FIG. 3A depicts the dual component architecture of a Threat Information Gathering and Incident Reporting (TIGIR) system according to an embodiment of the invention. The TIGIR system represents a threat-risk and reporting software system which addresses limitations within current cyber security methodologies and solutions by delivering two crucial cyber security functions for private and public sector clients across all sectors. TIGIR exploits an inventive algorithm to calculate client and sector factors such as impact, cost, etc. The main objectives of TIGIR systems according to embodiments of the invention are:

Support communication and collaboration among internal and external stakeholders to communicate threats and specific characteristics;

Provide a higher level of cyber security on IT infrastructure, networks, systems and devices with through comprehensive, cyber-appropriate threat/risk assessment and in depth analysis; and Provide compounded intelligence and real-time reporting of sector and platform-specific cyber threats to enhance client communication and collaboration allowing for immediate responses to new threats.

TIGIR systems may support compatibility with industry standards, methodologies, policies and processes and can be accessed by web-interfaced or enterprise systems. TIGIR systems 300 as depicted in FIG. 3A are conceptually comprised of two separate functional components that exchange data although it would be evident to one skilled in the art that the overall functional components may themselves be further partitioned and/or merged in different combinations without impacting the scope of the invention as defined in the claims.

As depicted in FIG. 3A the two functional components of TIGIR systems 300 are depicted as being executed within a Server 190, such as first or second server 190A/190B in FIG. 1, or as being executed within Electronic Device 204 such as described and depicted in respect of FIG. 2. The two functional components being:

Threat Risk Assessment and Analysis (TRAA) 310; and
Threat Reporting and Response Database (TRRD) 320.

The data yielded from the TRAA component allows for the TRRD to enhance communication and collaboration through multiple stakeholders. Within the cyber security industry there are a series of practical problems that TIGIR systems 300 are intended to address. These include Increasingly Complex Threats, Out-dated Threat-Risk Assessment Functions and Standards, Lack of Repeatability, Lack of Dependency, Increased Corporate and Organizational Liability, and Lack of Cross-Sector Communication and Collaboration. Each is briefly outlined below together with a perspective on how a TIGIR system 300 addresses that practical problem.

Increasingly Complex Threats: Threat technologies, threat strategies and their implementation have outpaced national and international legislation. A global network of software engineers with global access to a massive knowledge base of cyber security information can exploit global communications and networks with industry leading commercial servers etc. to attack private and public enterprises, Governments, utilities and infrastructure. The technology is easier and cheaper to acquire and labour rates in many jurisdictions for highly qualified software engineers are low leading to engineers working without knowledge of the use of their software or even hacker services for hire.

TIGIR systems 300 address this by being scalable, agile, and self-refining in their discrete and combined intelligence as more data is added and compounded and as the threat landscape changes. Further, TIGIR systems 300 address the asymmetrical nature of threats by examining multiple domains and attack means, e.g. cyber, physical, social engineering, etc.

Out-Dated Threat-Risk Assessment Functions and Standards: Whilst some attempts at standards such as the Government of Canada's Information Technology Security Guidance document "IT Security Risk Management: A Lifecycle Approach" (ITSG-33) have been published these typically exploit outdated approaches and prevent the inclusion of threat attributes in the current environment, i.e. rapidly evolving establishment of Web 2/3.0. Further these are not scalable, complex to operationalize, more theoretical than practical, and open to interpretation. Further, there are gaps in the vulnerability analysis foundation and weak calculations of residual risks coupled with a lack of analysis and granularity in definition tables.

TIGIR addresses this by fully compatible with industry standards and methodologies and improves upon them by expanding degree of harm, costs and impacts through primary, secondary and tertiary levels; expands analysis on policy, procedures and vulnerabilities at safeguard selection; revitalizes terms and definitions; improves on risk rating and constraining process steps; provides verifiable, measurable analysis for improved decision-making and robust cost of recovery.

Lack of Repeatability: By which the inventors mean the lack of repeatability of processes and methodologies with respect to cyber security. Further there is a general inconsistency in the skills sharing/transfer exchange for security practitioner resources: TIGIR addresses this by providing a repeatable but flexible and domain and sector specific methodology that is fully accessible and functional through a software solution. This allows for consistency and the reduction of subjective truth or understanding of systems by resources, reducing resource costs and training.

Lack of Dependency: By which the inventors means that there is a lack of dependency of the current cyber security methodologies on the validation and/or up-dating of architecture diagrams, corporate and organizational information, financial information, asset and target details, etc. Typically, an enterprise will perform a cyber security review or audit once and then not update this to reflect new information externally as well as information regarding the internal system adjustments, replacements, expansions, additions etc. TIGIR addresses this by requiring that all mandatory documentation and artifacts are up to date and validated before proceeding with threat risk assessment and analysis.

Increased Corporate and Organizational Liability: By which the inventors refer to the increasing liability of individuals and enterprises, such as Canadian Bills S-4 and C-13 for example, associated with cyber-attacks and exploitations of data acquired through cyber breaches. These increased liabilities make threat-risk analysis a crucial business activity for all private sector and public sector organizations. Further, even without Governmental regulatory activities the high visibility and rapid dissemination of data related to any real or perceived cyber breach has potential for significant losses whilst costs associated to damage, competitiveness, and customer credibility have risen significantly. In many instances, a significant cyber breach of customer data may fatally cripple a business or enterprise.

Lack of Cross-Sector Communication and Collaboration on Threats: It has been shown in other commercial and scientific activities that wider communications and collaboration between multiple levels within a single market sector or across multiple sectors results in improved detail of solutions, increased rate of establishing solutions and effective intelligence. The inventors believe that through multi-sector compounded historical data and analysis that the control of active threats can be improved. Further, improved prevention, detection, response and recovery processes result. TIGIR addresses the last two problems by reducing incidence of threats, closing command and control (shortening the lifespan of threats) and creating up-to-date, common attributes as a foundation for preventative intelligence.

C: TIGIR Computational Process

The computational process of TIGIR according to embodiments of the invention were designed by the inventors to initially address the business problems they identified using a "divide and conquer" approach, solving each profile issue as a set of sub-problems with tiered solutions. Then the solutions are married to develop a formula ready for calculation with its dependent entities. The logic behind this approach is that the longer the computational process, the more difficult to perform root cause analysis to address errors. Therefore, the riskier and higher work effort problems are solved first in their assignment of priority and dependency to other entities; these deconstructions allow for any problem to be worked on without impacting its upstream or downstream counterparts.

The computational process of TIGIR according to embodiments of the invention were also aimed at inverting and reversing the Abilene Paradox. Namely, that TIGIR address the needs of specific assessment types and domains, as opposed to homogenizing all threats and relying on one approach to fit all needs. Rather than allowing long-standing methodologies to lead solutions on the assumption that if it works for one, it works for all, it relies on organizational, sector, target, asset, threat, and vulnerability characteristics to differentiate with multiplicity to develop the most specific assessment lens and specific intelligence relevant to that user (client). A few of the threat risk problems TIGIR's computational process addresses can be expressed as how to qualify and quantify:

The value of the organization? To the market, sector, economy, etc.
The threats and vulnerabilities? Who and what are they?
The targets and assets that need to be protected? And why?
Various impacts if assets were stolen, damaged, interrupted, or modified?
The value of targets and assets to the organization?
The value of the asset to the market, sector, economy, etc.?
What is being done to minimize exposure?
What more can be done to minimize or manage exposure and liability?
What changes, including new additions, updates, reconfigurations to the organization's security countermeasures would modify the security posture?

When a cyber breach occurs it typically takes months to detect them and even then approximately 70% of breaches are discovered by external parties. This is an area of considerable opportunity for TIGIR particularly in lieu of constantly evolving threat vectors, advanced persistent threats that embed and morph and threat risk activity or audit latency.

C1: Threat Risk Assessment and Analysis Component (TRAA)

Figure 3B:
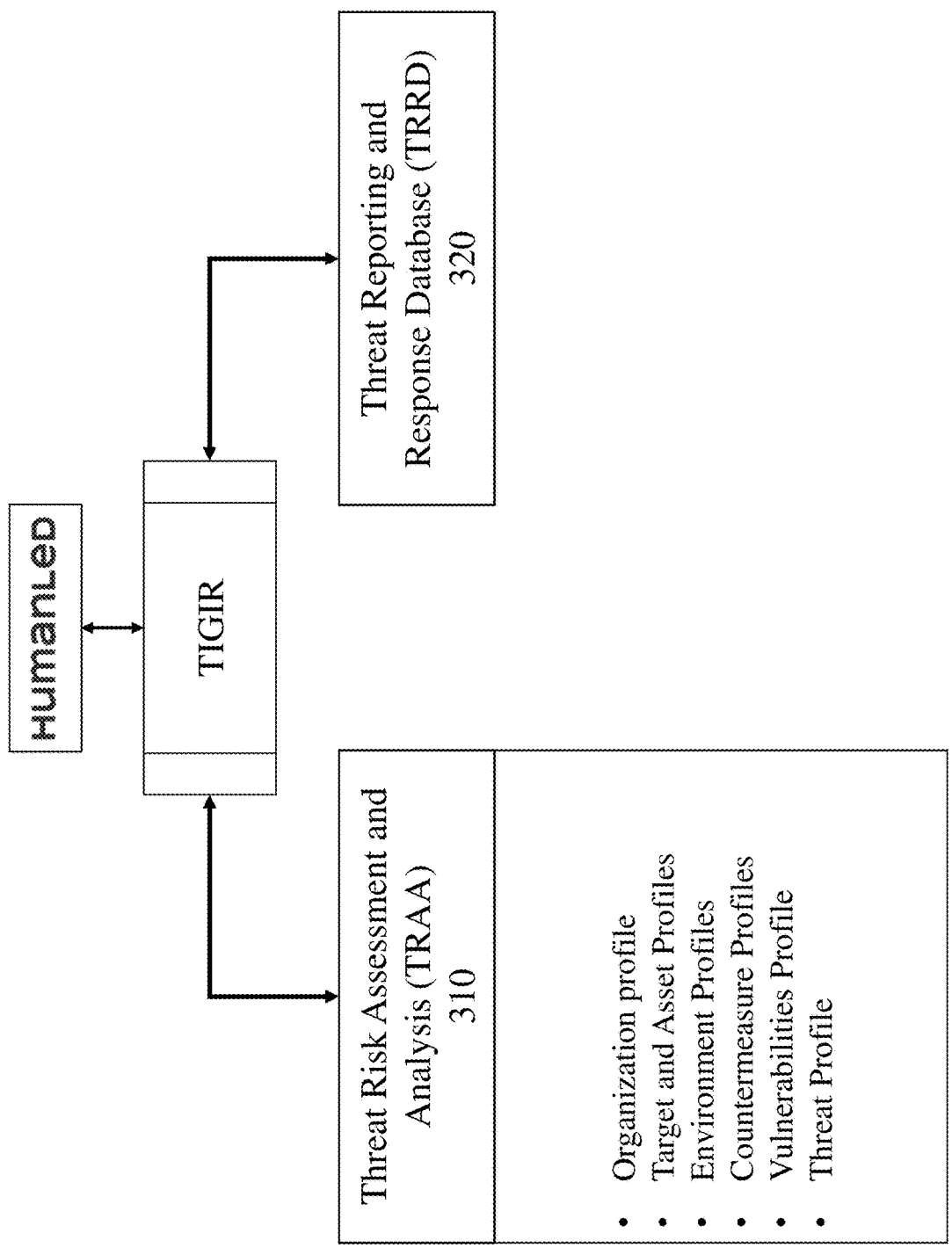
FIG. 3B depicts functionality of the Threat Risk Assessment and Analysis component of the TIGIR system as depicted in FIG. 3A.

The Threat Risk Assessment and Analysis (TRAA) component of TIGIR provides a higher level of cyber security on Information Technology (IT) infrastructure, networks, systems and devices with through comprehensive, cyber-appropriate threat/risk assessment and in depth analysis. TIGIR uses a unique algorithm that considers industry ratings on threat types, threat impacts, degree of harm, macro- and micro-level asset and sector costs, as well as the incidence and prevalence of particular threats in a sector. The resulting analysis is specific to the client while providing metrics on sector impacts and costs. The TRAA establishes an organization's current state and identifies cyber security gaps by analysing data gathered within several aspects of the organization as depicted in FIG. 3B.

The TRAA portion of TIGIR uses an inventive algorithm as described here and below that considers industry ratings on threat types, threat impacts, degree of harm, macro- and micro-level asset and sector costs, as well as the incidence and prevalence of particular threats in a sector. The resulting analysis is specific to the client while providing metrics on sector impacts and costs. The TRAA establishes an organization's current state and identifies cyber security gaps by analysing data gathered in the following domains:

Organization Profile;
Target and Asset Profiles;
Environment Profile;
Countermeasures Profile;
Vulnerabilities Profile; and
Threat Profile.

The TRAA uses a variety of algorithms and data within these domains to perform the assessment and analysis resulting in threat/risk, residual risk score and fit/gap recommendations. If we now consider these domains then Sections C1.A to C1.F define exemplary factors within each domain together with whether they are external variables (EXT-VAR) which are obtained from external data sources or internal results (internally generated variable data, INT-VAR) established through an algorithm. These form an exemplary data dictionary for a TRAA within a TIGIR according to an embodiment of the invention. This exemplary data dictionary is depicted in FIGS. 5 to 8 respectively.

C1.A Organizational Profile

The Organizational Profile gathers organizational, financial and market information and, includes but is not limited to organizational "tombstone" information, such as Sector, Entity type and Operating Country(s) and generates valuation outputs, using one or more input/output models, which are expressed as ranges. These being Organizational Value, Organizational Influence, and Service/Product Influence. The Organizational Value is the rated value of the organization as an entity and is calculated and expressed as a series of ranges from the organization's own data including, but not limited to, Revenue, Net asset value, Number of employees by operating country, Number of employees by region, and Total number of employees.

C1.B Organizational Influence

Organizational Influence is the rated value of the organization's external influence on economies, labour (employment) and its intermediaries to sector(s), operating country and regions, expressed as a ranges, where each country and region has an assigned value that represents its economic position as calculated from variables such as RDP/GDP, stock exchange index, credit score, interest rate, inflation rate, exchange rate and unemployment for example.

Selected Sector Sensitivity and Value

Sector Economic Sensitivity—Calculated from primary, secondary and tertiary ranges to determine the criticality of the sector from an economic perspective, such as, energy sector would rate higher than manufacturing in terms of primary criticality;

Sector Public Safety Sensitivity—Calculated from primary, secondary and tertiary ranges to determine the criticality of the sector from a public safety perspective, such as, food or water sector would rate higher than manufacturing in terms of primary critically and corresponds with speed/rate of contact or consumption;

Sector Value—A numerical value of that sector's economic value overall.

Organization Sector Share—Total organization share of the sector summed from all operation Selected Country Economy and Labour; and For each country the organization is present in then parameters for that jurisdiction are established. These include, but are not limited to:

Operating Country Economy Value;

Organizational Economic Share—Total organizational share of that economy;

Country (s) Labour Value; and

Organizational Labour Share—Total organizational share of labour within Operating Country Selected Region Economy and Labour For each region the organization is present in then parameters for that jurisdiction are established. These include, but are not limited to:

Region(s) Economy Value;

Organizational Regional Economic Share Value—Total organization share of the economy for that Region;

Region Labour Value; and

Organizational Regional Labour Value—Total organization share of labour by Operating Region.

The Service/Product Influence is calculated through the global and country(s)/region(s) market value and the organization's market shares of the service(s)/product(s) together with the global market and country/region breakdowns.

Service(s)/Product(s)

For each product/service class the organization is active within the parameters for that service or product are established. These include, but are not limited to:

Service(s)/Product(s) selection and sub-types; and

Service(s)/Product(s) market and market segments.

Global Market

Global Market Value; and

Organizational Market Share—Total organization share of the market.

Country(s)/Region(s) Market

Global Market Value—Numerical/Dollars;

Organizational Market Share—Total organization share of the market; and

Organizational Customer Base—Organization customer total number and percentage of Critical Product/Service and Government Contracts.

C1.C Asset and Target Profile

The Asset and Target Profile determines the rated value of the asset and that is being securitized, its characteristics, cost and degree of harm, if breached. As well it considers the Target as a separate entity and provides a rated value based on its characteristics and its relationship to the asset. The Asset and Target Profile is directly linked to the Environment Current State (Countermeasure) Profile and vulnerabilities and details the tools, policies, processes, and resources invoked if a breach occurs and at which phase. The Asset and Target Profile generates valuation outputs, using an input/output model, expressed as ranges, including but not limited to Asset Characteristics and Influence, Target Characteristics, Value and Cost, and Asset Value and Impact Cost. Considering these individually:

Asset Characteristics and Influence

Asset Characteristics and Influence is the rated value of the asset based on the following characteristics, providing the Asset Value and Asset Impact Cost:

Asset State—The state relates to whether the asset requires securitization while within its different states, which may for example be "In Transit", "In Use", and/or "In Storage"; recognizing that the less control the higher the associated risk to the state.

Asset Type—The type can be categorized into a category of which examples include Information (refined or unrefined content as a document or diagram), Data (operational code, configuration values, schematics, etc.), Device/Equipment, Tangible/Intangible Product or Internal/External Service—List; Range.

Asset Classification—The classification of the asset is either unclassified/public or classified and subject to further distillation; the more an asset is replicated or shared and the less control over replication there is (control over versions, patents, copyrighting, etc.), the less valuable the asset is typically.

Asset Owner—The possession of the asset relates to the level of responsibility, accountability and us of the asset and whether the possessor owns it or is custodian.

Asset Hardening/Countermeasures—The countermeasures are selected by type and subtype and are constrained only those that are triggered should a breach occur, by phase. This includes all technologies, safeguards, policies, processes, procedures and resources; the more types and sub-types involved, the higher the hardening rating.

Asset Actual Value—The actual value relates the expended cost of the asset—Numerical.

Asset Replacement Actual Cost—The cost to replace the asset to its recovered state.

Asset Inferred or Soft Value—The inferred value or cost that is intangible, where reputation, credibility or integrity may be compromised.

Secondary Value—The value associated to a secondary or dependent entity, such as a partner or intermediary.

Target Characteristics and Value

Target Characteristics and Value is the rated value of the target (that contains the asset) based on the following characteristics which when combined through an algorithm provide the Target Value.

Target Hardening/Countermeasures—The countermeasures are selected by type and subtype and are constrained only those that are triggered should a breach occur, by phase. This includes all technologies, safeguards, policies, processes, procedures and resources; the more types and sub-types involved, the higher the hardening rating.

Target Actual Value—The actual value relates the expended cost of the asset.

Target Replacement Actual Cost—The cost to replace the asset to its recovered state Target Inferred or Soft Value—The inferred value or cost that is intangible, where reputation, credibility or integrity may be compromised.

Secondary Value—The value associated to a secondary or dependent entity, such as a partner or intermediary—Numerical; Range.

C1.D Environment Current State (Countermeasure) Profile

The Environment Current State (Countermeasure) Profile determines, through a process of stated countermeasure and exclusion, the resulting rated vulnerabilities based on the asset that is being securitized.

Establishing the Environment's Current State

The Environment's Current State is established by indicating the existing and operable policies, procedures, processes and technological safeguards associated to the assets and targets, as well as their governance and continuous improvement and maintenance. While this does correlate to the Asset and Target Hardening/Countermeasures, the current state is a distilled view of the infrastructure and related countermeasures, as opposed to countermeasures by type and sub-type as indicated by triggered events. Extensive lists for countermeasure types and sub-types, that include policies, procedures, tools, safeguards and resources, will allow for a broad and descriptive perspective on the Environment's Current State and the integrity and stability of the status quo. For each countermeasure type and/or sub-type, the following may be stated:

Frequency
Action Process
Priority
Assigned/Unassigned
Known Unresolved Actions

C1.E Threat Scenario Profile

The Threat Scenario Profile addresses categories of threats towards assets and in some cases targets, all of which present various and varying impacts, consequences, costs and recovery policies, procedures, tools and resources. These are then presented as:

Asset/Target Theft
Asset/Target Modification
Asset/Target Disruption
Asset/Target Destruction Additionally, other factors may be taken into consideration with ratings determined from, for example, Threat Vector Assessment and Threat Domain(s) Assessment. Considering these, then:

Asset/Target Theft

The theft of an asset, or possibly a target that confines the asset, is defined and demonstrated as a specific scenario customized to the asset or target type and the current state countermeasures where the entire removal and/or loss of the asset or target has specific impacts to the organization and possibly to partners and intermediaries.

Asset/Target Modification

The modification of an asset, or possibly target configurations that confines the asset, is defined and demonstrated as a specific scenario customized to the asset or target type and the current state countermeasures where the delta from the original state to the modified one must be captured and where it has specific impacts to the organization and possibly to partners and intermediaries.

Asset/Target Disruption

The disruption of an asset, or possibly a target that confines the asset, is generally related to a service or supply of a product, where systems (i.e. SCADA) may be involved. Defined and demonstrated as a specific scenario customized to the asset or target type and the current state countermeasures, the disruption of termed where the asset remains and is re-configurable but has specific impacts to the organization and possibly to partners and intermediaries in its unavailability and integrity.

Asset/Target Destruction

The destruction of an asset, or possibly a target that confines the asset, is defined and demonstrated as a specific scenario customized to the asset or target type and the current state countermeasures where there is evidence of destruction of the asset or target and has specific impacts to the organization and possibly to partners and intermediaries.

Threat Vector Assessment

The Threat Vector Assessment provides a threat-risk assessment on the various vectors associated with the above scenarios as applied to the Environment Current State and the Asset and Target Profile valuation. This rating is complied with the Threat Domains Assessment and Economic Risk Assessment ratings to provide an output valuation of the Threat Scenario Profile.

Threat Domain(s) Assessment

The Threat Domain(s) Assessment provides a threat-risk assessment on the identified domains and are applied to the Environment Current State and the Asset and Target Profile valuation. This rating is complied with the Threat Vector Assessment and Economic Risk Assessment ratings to provide an output valuation of the Threat Scenario Profile.

C1.F Residual Risks and Recommendations

A Comprehensive Risk Assessment addresses separately and in detail key risk areas before consolidating them into the Residual Risk and Recommendations. These assessments may include, but not be limited to, Economic Risk Assessment, Competitive Risk Assessment, Harm Risk Assessment, and Liability Risk Assessment. Considering, for example these then:

Economic Risk Assessment

The Economic Risk Assessment provides an economic assessment from the Organization Profile (Organizational Value, Organizational Influence and Service/Product Influence) as applied to the Environment Current State, Asset and Target Profile and Threat Scenario valuations; this is examined and stated as primary, secondary and tertiary impacts to a variety of factors including, but not be limited to, Organization, Sector, Market, Region, and Country.

Competitive Risk Assessment

The Competitive Risk Assessment provides a competitive assessment from the Organization Profile (Organizational Value, Organizational Influence and Service/Product Influence) as applied to the Environment Current State, Asset and Target Profile and Threat Scenario valuations; this is examined and stated as primary, secondary and tertiary impacts to a variety of factors including, but not be limited to, Organization, Sector, Market, Region, and Country.

Harm Risk Assessment

The Harm Risk Assessment provides a physical harm assessment where injury or loss of life may occur from the Organization Profile (Organizational Value, Organizational Influence and Service/Product Influence) as applied to the Environment Current State, Asset and Target Profile and Threat Scenario valuations; this is examined and stated as primary, secondary and tertiary impacts to a variety of factors including, but not be limited to, Organization, Sector, Market, Region, and Country.

Liability Risk Assessment

The Liability Risk Assessment provides a liability assessment where contractual, regulatory and/or legislative contraventions or breaches may occur from the Organization Profile (Organizational Value, Organizational Influence and Service/Product Influence) as applied to the Environment Current State, Asset and Target Profile and Threat Scenario valuations; this is examined and stated as primary, secondary and tertiary impacts to a variety of factors including, but not be limited to, Organization, Sector, Market, Region, and Country.

C2: Threat Reporting And Response Database (TRRD)

The Threat Reporting and Response Database (TRRD) component of TIGIR provides for secure, encrypted data framework gathering from select internal sources, external sources in conjunction with select contributing client incident data resulting in compounded intelligence and real-time reporting of sector and platform-specific cyber threats to enhance client communication and collaboration allowing for immediate responses to new threats. Within an embodiment of the invention the TRRD may be open sourced and provide continuously compounded intelligence on historical and live threats.

Compounded intelligence and real-time reporting of sector and platform-specific cyber threats enhance client communication and collaboration allowing for immediate responses to new threats. The TRRD utilizes the data framework from the TRAA and accesses data from client input data and data from industry and academic databases; this data is normalized to ensure compatibility and relevancy to the database classes and algorithm elements and then made available for various report types and live alerts.

Figure 3C:
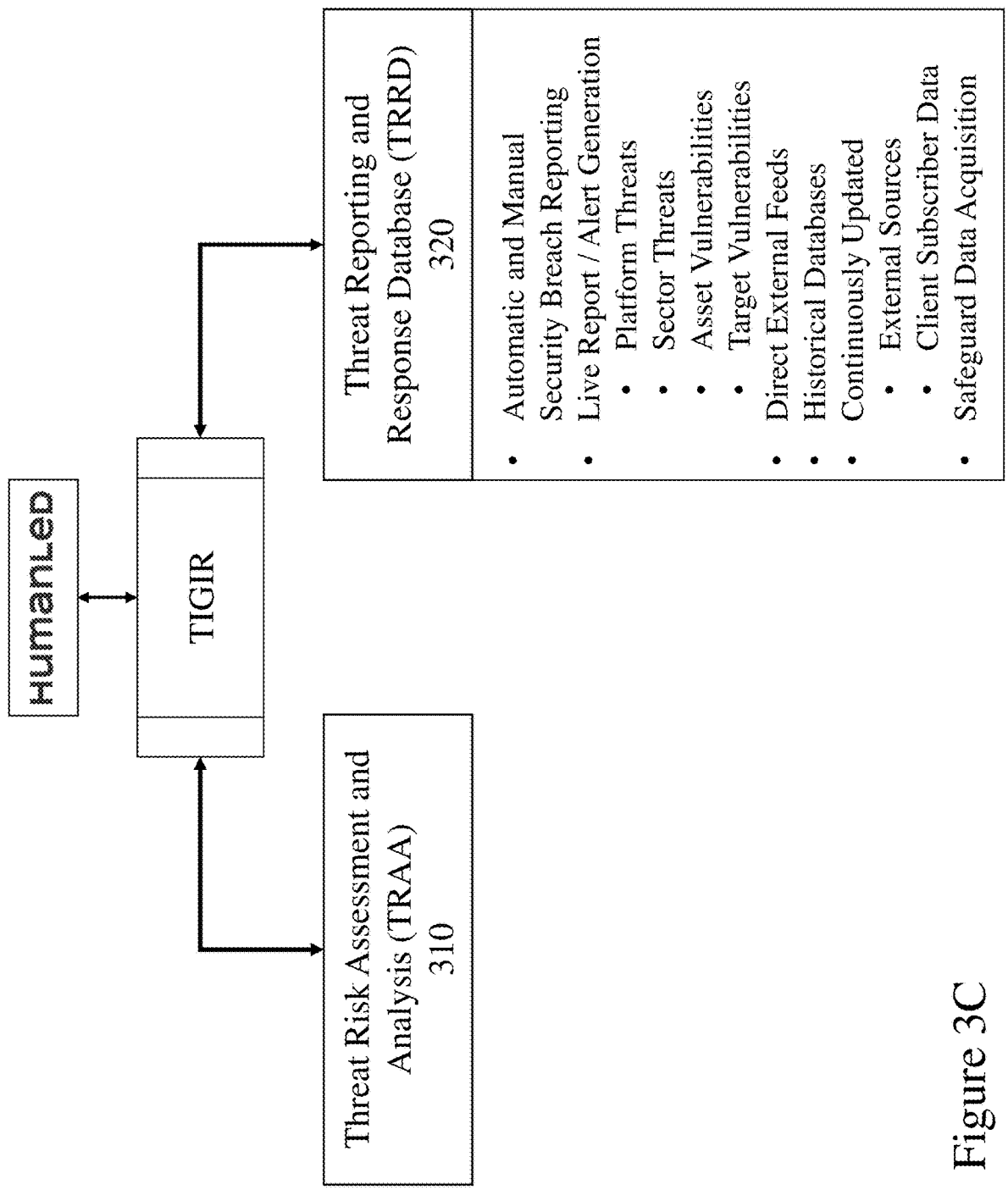
FIG. 3C depicts functionality of the Threat Reporting and Response Database (TRRD) component of the TIGIR system as depicted in FIG. 3A.

As depicted in FIG. 3C the TRRD provides:

Automatic and manual reporting on breaches;

Live reporting and alerts on all threats relevant to the client's platform, sector, assets and target vulnerabilities;

Direct external feeds of active and/or reported threats from various sources;

Historical data allowing for queries on established data elements

Continuous updating from external data sources (industry and academic) and client-subscriber data Collection and analysis of data from safeguards to monitor and measure effectiveness.

C3: Algorithm

Figure 4:
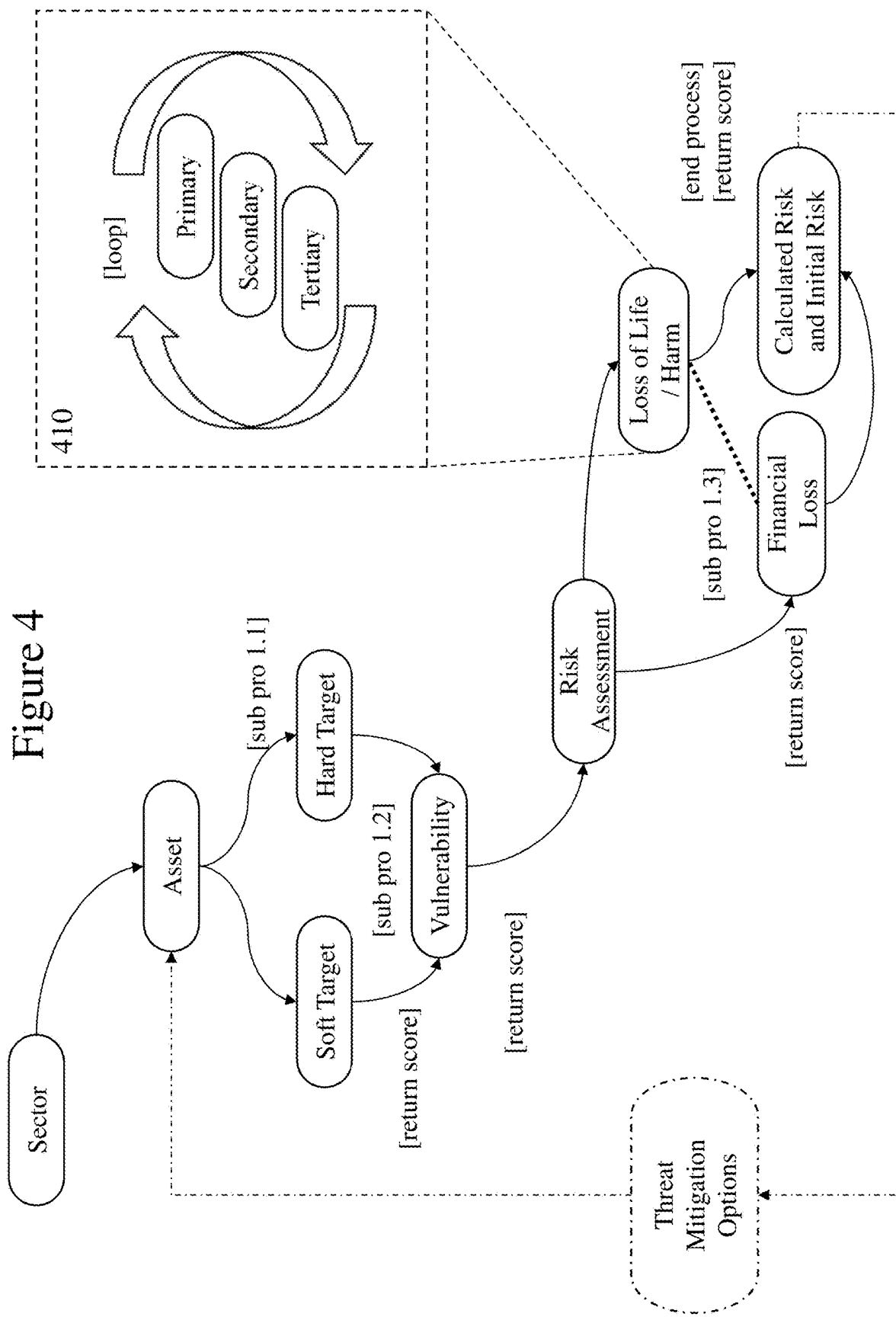
FIG. 4 depicts a high level overview of the TRAA component of TIGIR system depicted in FIG. 3B with respect to assets and vulnerability.

Referring to FIG. 4 there is depicted an exemplary high level process overview of the TRAA component of TIGIR system depicted in FIG. 3B with respect to assets and vulnerability. Accordingly, the process overview begins with definition of a sector relating to an enterprise, e.g. financial, manufacturing, retail, etc. From here the IT infrastructure assets of the enterprise are defined and categorized. For example, as indicated in FIG. 4 assets are categorized simply as "Soft Target" or "Hard Target." A "soft target" may for example be a social network profile of the enterprise within a third party social network (e.g. Facebook or LinkedIn) or a website providing product and enterprise information. A "hard target" may be an encrypted server on an enterprise network isolated from, for example, the network upon which the enterprises web servers are. Accordingly, the soft and hard target assets are assessed yielding a score for each which are then combined using a mathematical relationship forming part of the algorithm of the invention to generate a vulnerability score. Optionally, assets may be categorized to different target classes and the scores/combinations of scores, etc. adjusted to reflect soft, medium, hard targets etc. or whatever graded structure is applied.

Based upon the vulnerability assessment the process proceeds to establish a calculated risk based upon categories of damage, such as financial loss (cost), manufacturing interruption, reputation, share price, etc. through to considerations of whether cyber breaches may lead to loss of life, harm to animals, harm to human population etc. For each a "cost" (score) is calculated using a sub-process flow 410 and these are combined and accumulated within the algorithm according to a variety of factors including, but not limited to, potential scale of breach, sector factors, etc. This leads to an overall calculated risk.

Also established is an initial risk. For an initial assessment the calculated risk and the initial risk are the same. However, with an optional feedback process the enterprise may test/enact different threat mitigation options based upon analysis and assessment of other organizations, enterprises etc. These result in a new risk being calculated which is now compared to the initial risk allowing the threat mitigation options commercial advantage to be quantified. Accordingly, with different simulations the residual risk remaining after the threat mitigation can be viewed relative to the enterprise's cost of enacting the threat mitigation.

D: TIGIR Use Scenarios

Scenario 1—Threat Assessment and Analysis: Security practitioner (DISO, etc.) is tasked with producing a threat-risk assessment for a corporate network. Resource accesses the TIGIR TRAA and commences a step by step process of detailing assets and their specific characteristics, detailing threats based on internal (e.g. past breaches, audit logs, etc.) or external information (e.g. incident databases, security industry data, etc.) on the threat landscape and determination of vulnerabilities and risks (and associated costs) that provides the recommended countermeasure (processes, technological safeguards, etc.). Accordingly, the threat can be quantified and mitigation scenarios analysed, selected and enacted.

Problem Statement #1: Increasingly complex threats and threat technologies have outpaced legislation and approved technologies, are cheaper and easier to acquire and hacker services for hire are on the rise and readily available. TIGIR addresses this by being scalable and agile and self-refining as more data is added and compounded. Further, experiences of third parties are accessible in anonymised form.

Scenario 2·Daily Monitoring: Security practitioner (admin, etc.) has the daily task of examining threat alerts specific to the assets of the corporation. Resource accesses the TIGIR TRRD alerts or report data (sent to email, etc.) which provides information on active threats, their target assets, vectors, proliferations etc. As TIGIR provides for post-breach analysis and historical references then security practitioners can respond to a system breach, and once the appropriate isolation and recovery steps have been completed, the information from the breach and its vector details are gathered and entered in TRRD for comparison and matching (code characteristics, syntax, etc.) to identify threat actor(s) and then included in the database for historical reference. This data is then anonymised within TIGIR to form part of the historical databases as well as providing in conjunction with other breaches scaling factors for assessing different impacts of a cyber breach.

Problem Statement #2: Out-dated Threat-Risk Assessment Functions and Standards (i.e. ITSG-33) prevent the inclusion of threat attributes in current climate (Web 2/3.0); not scalable; complex to operationalize; more theoretical than practical and open to interpretation; gaps in vulnerability analysis foundation and weak calculation of residual risks; and lack of analysis and granularity in definition tables. TIGIR addresses this by being fully compatible with the Governmental, regulatory, international and industry's common standards and methodologies (CSE/RCMP HTRA, NIST, et al.) and improves upon them by expanding degree of harm, costs and impacts through primary, secondary and tertiary levels; expands analysis on policy, procedures and vulnerabilities at safeguard selection; revitalizes terms and definitions; improves on risk rating and constraining process steps; provides verifiable, measurable analysis for improved decision-making and robust cost of recovery.

E: Mitigation, Live Alerts, and Upgrades

Within the preceding description and discussion with respect to embodiments of the invention the focus has been towards Threat Information Gathering and Incident Reporting (TIGIR) system comprising threat-risk and reporting software systems to address limitations within prior art security systems. Accordingly, TIGIR systems through the Threat Risk Assessment and Analysis (TRAA) and Threat Reporting and Response Database (TRRD) components execute an assessment of security for a user and provides, in addition to the one or more assessments, one or more recommendations with respect to addressing any gap between target security and actual security.

It would be evident that in addition to discrete assessments that the inherent dynamic and real-time nature of the TIGIR components may be exploited to provide users with real-time updates of changes in their security status such as attacks, etc. These may, within embodiments of the invention, be electronically distributed to the user or defined individuals and/or entities where the user is an enterprise, organization, regulatory authority etc. Some live updates may require confirmation of receipt or specific authorised individuals to flag a corrective action being taken.

These live updates may form the basis of decisions and/or as triggers for the enactment of an upgrade and/or adjustment in the user's security profile. In some embodiments of the invention these live updates may, based upon data acquired through the TRRD for example, be recommendations such as "Vulnerability in Network Server Firewalls from WYSIWYG Trojan—Update Firewall." Others may identify specific upgrades such as "Doomsday Virus—Router Firmware Revision Z.99 Released."

Optionally, in some instances the TIGIR system may be authorised to trigger automatic updates based upon predetermined rules being identified such as that the specific individuals who flag a corrective action have not acknowledged the alert or flagged an action or that firmware updates to identified systems and sub-systems may automatically update upon identification that a specific update is required where such updates may be access only from specific pre-identified servers, etc.

F: Exemplary Embodiments of the Invention

In accordance with an embodiment of the invention there is provided a system comprising a first module allowing a user to establish in respect of one or more activities of an enterprise incorporating at least one of electronic devices and communications networks a threat risk assessment and analysis (TRAA) with respect to one or more attacks, and a second module allowing the user to access information relating to at least one of threat reporting and security responses in respect of one or more attacks.

In accordance with an embodiment of the invention there is provided a Threat Information Gathering and Incident Reporting (TIGIR) system comprising threat-risk and reporting software systems to address limitations present within current security methodologies and solutions enacted by an enterprise, wherein the TIGIR exploits an algorithm to establish at least one of a risk, a first cost associated with the risk, and a second cost associated with mitigating the risk.

In accordance with an embodiment of the invention there is provided a Threat Information Gathering and Incident Reporting (TIGIR) system comprising threat-risk and reporting software systems to address limitations present within current security methodologies and solutions enacted by a user, wherein the TIGIR exploits an algorithm to provide at least one of:
a current state assessment relating to security countermeasures undertaken by the user;
a dynamic report relating to a security posture of the user;
a risk rating by profile relating to countermeasures and securitization of an asset associated with the user; and
a recommendation relating to increasing a security position of the user.

In accordance with an embodiment of the invention there is provided a Threat Information Gathering and Incident Reporting (TIGIR) system comprising threat-risk and reporting software systems to address limitations present within current security methodologies and solutions enacted by an enterprise with respect to one or more security domains, wherein the TIGIR exploits first data relating to the user's assets, second data relating to the enterprise's security methodologies and solutions, third data relating to third party security methodologies and solutions and one or more algorithms to provide at least one of:
a user value and economic impact analysis to an enterprise's market, sector, operating country and regional levels in the event of a security breach towards the enterprise's asset(s);
provide risk analysis of an enterprise's current security posture from assessment of operationalized countermeasures as defined by at least one of policies, processes, resources and technological safeguards together with a vulnerabilities gap analysis of the enterprise's security;
identify residual risk and recommendations to reduce enterprise exposure and provide increased security within the one or more security domains;
collect internal, external and client-reported threat data and perform compound analysis of internal, external and client-reported threat data using detailed threat characteristics to enhance threat identification and distributed threat mitigation;
real-time reporting of sector and platform-specific security intelligence; and
data for anticipatory logic and predictive intelligence relating to at least one of threats, countermeasures, and capture analysis of technological safeguard effectiveness.

In accordance with an embodiment of the invention there is provided a Threat Risk Assessment and Analysis (TRAA) system for providing a higher level of cyber security on IT infrastructure, networks, systems and devices with through comprehensive, cyber-appropriate threat/risk assessment and in depth analysis.

In accordance with an embodiment of the invention there is provided a Threat Reporting and Response Database (TRRD) system for providing secure, encrypted data gathering from external sources and client incident data resulting in compounded intelligence and real-time reporting of sector and domain specific cyber threats to enhance client communication and collaboration allowing for immediate responses to new threats.

In accordance with an embodiment of the invention there is provided a Threat Information Gathering and Incident Reporting (TIGIR) system providing threat-risk and reporting software in respect of security methodologies and solutions by providing: communications and collaboration among internal and external stakeholders to communicate threats and specific characteristics;
a higher level of cyber security on IT infrastructure, networks, systems and devices with through comprehensive, cyber-appropriate threat/risk assessment and in depth analysis; and
compounded intelligence and real-time reporting of sector and platform-specific security threats to enhance client communication and collaboration allowing for immediate responses to new threats.

In accordance with an embodiment of the invention there is provided a Threat Information Gathering and Incident Reporting (TIGIR) system providing threat-risk assessment and a risk mitigation solution with respect to assets of a user within one or more security domains of the user, wherein
the one or more security domains selected from the group comprising network security, application security, physical security, infrastructure security, data/information security, contracting and vendor security; and
the risk mitigation solution is the solution applies to all of the assets of the user but is centered upon cyber security through application of constructions to one or more layers selected from the group comprising physical layer, data link layer, network layer, transport layer, session layer, presentation layer and application layer.

In accordance with an embodiment of the invention there is provided Threat Information Gathering and Incident Reporting (TIGIR) system providing threat-risk assessment and a risk mitigation solution with respect to assets of a user within one or more security domains of the user comprising:
a Threat Risk Assessment and Analysis (TRAA) system for providing a higher level of cyber security on IT infrastructure, networks, systems and devices with through comprehensive, cyber-appropriate threat/risk assessment and in depth analysis of an organization's current state and identifies cyber security gaps by analysing data gathered with respect to one or more profiles; wherein
the one or more profiles are selected from the group comprising an organization profile, a target and asset profile, an environment current state (countermeasure) profile, a threat scenario profile, and a residual risks and recommendations profile; and
a Threat Reporting and Response Database (TRRD) system for providing secure, encrypted data gathering from external sources and client incident data resulting in compounded intelligence and real-time reporting of sector and domain specific cyber threats to enhance client communication and collaboration allowing for immediate responses to new threat by at least one of:
gathering and compound analysing internal, external and client-reported threat data using detailed threat characteristics to support open-source communication and collaboration and threat identification;
real-time reporting of sector and platform-specific cyber intelligence allowing faster response to new threats;
allowing queries on historical data and established data elements established from threat characteristics;
foundation for anticipatory logic and predictive intelligence on threats and countermeasures and log analysis of technological safeguard effectiveness; and
collection and analysis of data from safeguards to monitor and measure effectiveness.

G. Exemplary Software Embodiment

As outlined supra TIGIR addresses the business problem of protecting the business against threats—any kind of threat—regardless of the organization, asset, sector or country. TIGIR provides an effective solution based on practically-tested methodologies established and developed by the inventor that adhere to processes that are technology-agnostic and that treat all assets with the same risk assessment methods due to the inter-connected combination of business driven inputs and automated systems. TIGIR also specifically addresses the increasingly asymmetrical nature of threats.

Accordingly, TIGIR utilizes a unique valuation and scoring algorithm as discussed and described supra to calculate client and sector impacts, cost, etc. through a threat risk assessment and analysis on client-identified assets. TIGIR therefore generates through the business data input and its algorithms a series of outputs including, but not limited to:
Detailed strengths and weaknesses in protecting organizational assets through a comprehensive risk analysis;
Assessment of all operationalized countermeasures—policies, processes, resources and technological safeguards—and vulnerabilities;
Gap analysis on residual risk resulting from the above and specific recommendations to confront and reduce the risk;
Organizational and economic impact analysis and value to an organization's market, sector, operating country and regional levels in the event of a security breach; and
A framework to gather and compound analysis of internal, external and client-reported threat data using detailed threat characteristics to support open-source communication and collaboration and threat identification Embodiments of TIGIR as embodied by the inventor are fully compatible with industry standards including, Canadian Communications Security Establishment Information Technology Security Guidance "IT Security Risk Management: A Lifecycle Approach" (ITSG-33, November 2012), Canadian Communications Security Establishment Harmonized Threat and Risk Assessment (HTRA, Canada School of Public Service # A341), United States National Institute of Standards and Technology, and the International Standards Organization (ISO). TIGIR accordingly provides:
In Depth Assessment, Analysis and Valuation of Targets and Assets and Security Capabilities in Various Threat Scenarios;
Industry Standard Compatible Recommendations in Several Report Formats;
Validation of Countermeasures;
Control of Threat Risk Mitigation Activities and Security Posture;
Point-in-Time and Immediate View of Security Posture—Anytime, Anywhere; Scalable and Customizable to the Business Size by Asset, Line of Business, Market and Custom Terms and Labels for Ease of Use; and
Compounded Threat Intelligence to Enhance Secure Sharing and Collaboration to Defeat Threats.

Through the standardised entry methodology and algorithms TIGIR reduces work effort significantly, cuts resource costs, and allows for high repeatability and consistency of the resource for initial and subsequent updates. As discussed supra TIGIR comprises a TRAA component and a TRRD components. The TRAA establishes an organization's current state and identifies cyber security gaps by analysing data gathered in the following components of the TRAA:

Organization Profile: Organizational and Influence and Service/Product Influence; Selected Sector Country and Region Economy and Labour Target and Asset Profile: Asset and Target Characteristics and Value Environment Current State (Countermeasure) Profile: Frequency, Action, Process, Priority Threat Scenario Profile: Threat Vector Assessment and Threat Domain(s) Assessment including Asset/Target Theft, Modification, Disruption and Destruction;

Residual Risks and Recommendations: Economic, Competitive, Harm and Liability Risk Assessments These are related according to the Equation (1) below wherein $A^V$ represents the value of the organization's assets, $T^S$ is related to the sophistication of the threats, $V^N$ is the number of vulnerabilities, $R^T$ is the total residual risk and $R_{IMPLEMENT}$ is the implemented recommendations and resulting security posture.

$$A^V + T^S + V^N = R^T - R_{IMPLEMENT} \quad (1)$$

TIGIR as established by the inventor addresses a wide variety of current practical problems for organizations in terms of securitizing assets and systems, especially within the protection of data in the cyber security domain. As such TIGIR allows a business to address a variety of aspects including:

Increasingly complex threats and technologies that are cheaper and easier to acquire which TIGIR addresses by examining multiple domains and attack means such as via cyber, physical, social engineering, etc.;

Removing out-dated threat-risk assessment approaches and standards through a methodology that allows inclusion of threat attributes reflective of the current climate through compatibility with industry standards and methodologies, expanding on degree of harm, costs and impacts, safeguard selection, improved risk rating, constrained process steps and provides verifiable, measurable analysis for improved decision-making and robust cost of recovery;

Eliminates non-repeatable, objective processes and methodologies with low skill levels of employees for sharing/transfer/exchange of security practitioner resources by domain is replaced by a repeatable but flexible and domain and sector specific methodology that is fully accessible and functional through a software solution in control of the customer;

Increasing liability for businesses associated with loss of data etc. resulting from cyber-attacks and exploitations make threat-risk analysis a crucial business activity for all organizations wherein TIGIR reduces the incidence of threats, closing command and control (shortening the lifespan of threats) and creating up-to-date, common attributes as a foundation for preventative intelligence and reporting.

Figure 9:
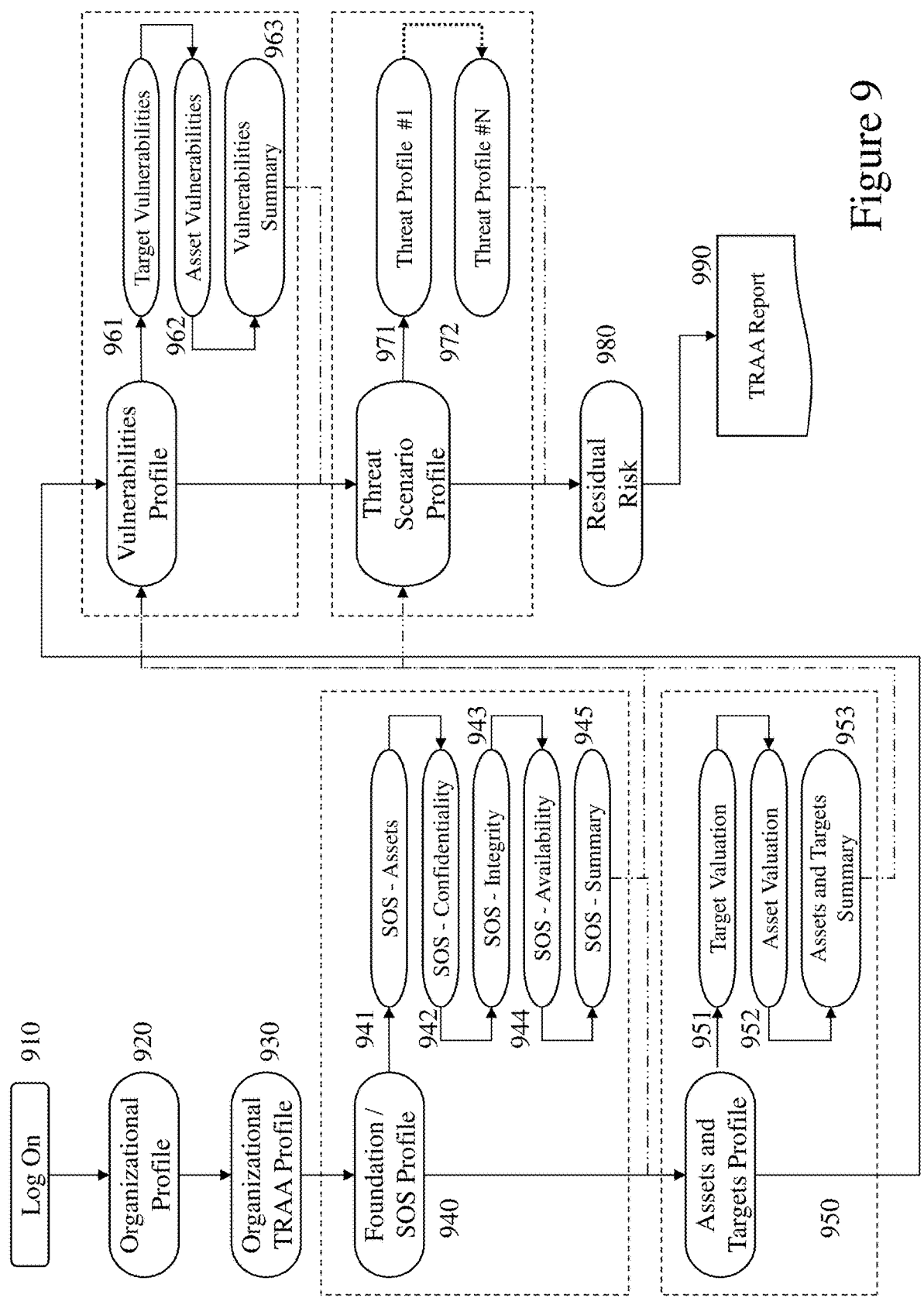
FIG. 9 depicts an exemplary process flow for a TIGIR system according to an embodiment of the invention relating to establishing a Threat Risk Assessment and Analysis (TRAA) profile.
Figure 10:
FIG. 10 depicts exemplary web forms for a TIGIR system according to an embodiment of the invention relating to an organization profile and its Threat Risk Assessment and Analysis (TRAA) profile.

Referring to FIG. 9 then once an organization has installed TIGIR's TRAA application on their preferred device(s) and activated their license(s) the organization can begin establish the information dataset required for the analysis. Organizational installation also may include chief information security officer (CISO) approved user account(s) setup and user permission assignment(s). Accordingly, at step 910 a user logs onto the TIGIR TRAA application and is promoted to complete the Organizational Profile in step 920 as embodied by exemplary web form 1000 in FIG. 10. This Organization Profile represents the tombstone information of the organization that constrains and determines applicability of certain data, such as operating country and entity sector, that will apply to any and all TRAAs performed for the organization.

Under the Organizational Profile several TRAAs can be performed on many systems, structures, objects, etc. and are identified by a unique identifying number. This allows for the updating of any TRAA record as frequently as required without starting all over and permits the comparison and linking of TRAA records in the future.

The core design of TIGIR's TRAA relies on decision-based data and flow data to reduce work effort, improve accuracy and increase the robustness and meaning of the valuation results and final report data. The Organizational Profile, which includes the Organizational Value, Organizational Influence and Service/Product Influence and determines in part the organization's value and influence, and saves the record.

Subsequently, in step 930 the user completes the Organizational TRAA Profile on the desired system, structure, object, etc., their location(s) and associated assets. Both locations and assets can be one or many and may also be added at any time in the TRAA process. The Organizational TRAA Profile may be viewed as the "mandatory" information required to save the record. Assets identified here are ported forward to the Assets and Targets Profile and the Vulnerability Profile once verified and detailed. The sector, economic and market value and influence begins to be established in this Profile. Exemplary web entry forms for the Organizational Profile are depicted with first and second web forms 1000 and 1050 in FIG. 10 respectively.

Figure 11:
FIGS. 11 and 12 depict exemplary web forms for a TIGIR system according to an embodiment of the invention relating to entry of sensitivity data.
Figure 12:

Next in step 940 the user completes the Foundational/Statement of Sensitivity (SOS) Profile, which includes multiple Statements of Sensitivity such as SOS—Assets 941, SOS—Confidentiality 942, SOS—Integrity 943, and SOS—Availability 944 for example. The target and asset cost sensitivity begin to be established in this Profile. Exemplary web entry forms for the Foundational Profile SOS are depicted with first and second web forms 1100 and 1150 in FIG. 11 respectively together with first and second web forms 1200 and 1250 in FIG. 12 respectively. Upon completion an SOS—Summary 945 is provided for approval that details the assets, lines of business, and the confidentiality, integrity and availability ratings wherein an exemplary web form is depicted in first web form 1300 in FIG. 13.

Figure 15:

Progressing on the user next completes the Assets and Targets Profile in step 950 including gathering Asset Characteristics and Influence and Target Characteristics and Value that further valuates these items and calculates the variables established so far taking into consideration the valuations from the Organizational Profile, Organizational TRAA Profile and Foundational Profile and Statement of Sensitivity. Accordingly, the user enters data within a series of workflows including, for example, Target Valuation workflow 951 and Asset Valuation 952 before being presented with an Assets and Targets Summary 953. Exemplary web entry forms for the Asset and Target Profile entry are:

Second web form 1350 in FIG. 13 relating to a summary of Asset: Evidence;

First and second parts 1400 and 1450 in FIG. 14 of a web form relating to the entry a summary of Asset: Evidence;

First web form 1500 in FIG. 15 relating to a web form for Asset and Target Profile entry;

Second web form 1550 in FIG. 15 relating to a web form for Target Valuation within Asset and Target Profile entry;

First web form 1600 in FIG. 16 relating to a web form for Asset Valuation within Asset and Target Profile entry; and Second web form 1650 in FIG. 16 relating to a web form displaying a summary of the Asset and Target Profile.

Next the user completes a Current State and Vulnerability Profile in step 960 that determines the vulnerabilities associated with the identified targets and assets and compares them to the current state, baselining the risk rating. The vulnerability, current state, countermeasures and security posture are established in this Profile to set the gap to future state. It calculates the valuation in this Profile taking into consideration the valuations from the Organizational Profile, Organizational TRAA Profile and Foundational Profile and Statement of Sensitivity and Assets and Targets Profile. Accordingly, the user enters data within a series of workflows including, for example, Target Vulnerabilities workflow 961 and Asset Vulnerabilities 962 before being presented with a Vulnerabilities Summary 963.

Finally, the user completes the Threat Scenario Profile 970 that determines the relevant scenarios associated with the organizations itself and its assets and targets that are in scope of the TRAA including Threat Vector Assessment and Threat Domain(s) Assessment. The Threat Scenario Profile 970 comprises one or more profiles, Threat Profiles #1 971 to Threat Profile # N 972, from which are determined the threat scenario costs, impacts and recovery and mitigation and calculates the valuation in this Profile taking into consideration the valuations from the Organizational Profile, Organizational TRAA Profile and Foundational Profile and Statement of Sensitivity and Assets and Targets Profile.

The final report and recommendations including the Economic Risk Assessment, Competitive Risk Assessment, Harm Risk Assessment and Liability Risk Assessment are generated and ready for review and approval. Once approved, the application provides the options of an executive report, full report or a HTRA compatible format. At this point the user logs out and the TRAA report record remains to be updated or modified at any time, maintaining a point-in-time view and valuation of the security posture of the in scope assets and targets. Additional dashboard and scorecard features, alert reminders and incident-threat data collection may be configured.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A Threat Information Gathering and Incident Reporting (TIGIR) system comprising:
   a threat-risk and reporting software platform in execution upon a computer system comprising at least a microprocessor, the platform comprising
   a first module for accessing first data relating to first values within different security domains within an enterprise of known assets of the enterprise;
   a second module for accessing second data relating to current security methodologies and solutions enacted by the enterprise within the different security domains; and
   a third module for establishing at least one of:
   a risk and a risk level associated with the assets of the enterprise within the different security domains;
   a first cost associated with the risk becoming an actual occurrence within at least some of the different security domains; and
   a second cost associated with mitigating the risk by reducing the risk level of the risk within at least one security domain, the second cost accounting for residual risk within others of the different security domains.

2. The TIGIR system according to claim 1, further comprising
   a fourth module allowing a user to establish in respect of one or more activities of an enterprise incorporating at least one of electronic devices and communications networks a threat risk assessment and analysis (TRAA) with respect to one or more first security attacks against the at least one of electronic devices and communications networks of the enterprise; and
   a fifth module allowing the user to access information relating to at least one of threat reporting and security responses in respect of one or more second security attacks against at least one of other electronic devices and other communications networks of other enterprises.

3. The TIGIR system according to claim 1, further comprising
   a fourth module allowing the threat-risk and reporting software platform to:
   access information within one or more remote servers accessible to the threat-risk and reporting software platform via one or more telecommunication networks; and
   access third data relating to at least one of threat reporting and security responses in respect of one or more second security attacks against at least one of other electronic devices and other communications networks of one or more other enterprises not associated with the enterprise.

4. The TIGIR system according to claim 1, further comprising
   a fourth module providing secure, encrypted real-time data gathering from external sources of client incident data relating to cyber threats; and
   a fifth module analyzing in real-time the gathered secure, encrypted data in dependence upon at least the first data and the second data to generate compounded cyber threat intelligence data and real-time reporting of sector and platform-specific cyber threats; and
   a sixth module providing real-time communications to predetermined individuals within the enterprise relating to the security domain of the cyber threats.

5. The TIGIR system according to claim 1, further comprising
   a fourth module for accessing a remote Threat Reporting and Response Database (TRRD) system other than belonging to the enterprise which provides secure, encrypted data gathering from external sources and client incident data resulting in compounded intelligence and real-time reporting of sector and security domain specific cyber threats; and a fifth module for updating the first data and the second data in response to the remote previously stored third party data.

6. The TIGIR system according to claim 1, wherein the third module is for establishing at least two of:

the risk and the risk level associated with the assets of the first enterprise within the different security domains;

the first cost associated with the risk becoming an actual occurrence within at least some of the different security domains; and the second cost associated with mitigating the risk by reducing the risk level of the risk within at least one domain, the second cost accounting for residual risk within others of the different security domains.

7. A computer-implemented method for performing Threat-Risk Analysis (TRA), Information Gathering and Incident Reporting (IGIR) comprising:

accessing a first data to provide first output data relating to the first data, the first data relating to first values within different security domains within an enterprise of known assets, the first values relating to a predicted or known cost of at least one of failure and change of the asset within at least one security domain of the different security domains;

accessing a second data and assessing the second data to provide second output data relating to an evaluation constrained by the first data, the second data relating to a current security environment of the enterprise and known actions within the current security environment for security and for remediation;

accessing a third data to determine third output data comprising a numerical indicator relating to an impact of failure or compromise of the assets within the different security domains; and a sub-module for accessing the first output data, the second output data and the third output data and for processing the first output data, the second output data and the third output data to determine a gap analysis for providing an output risk level, output cost of risk and output probability of risk for a predetermined occurrence that is associated with the assessed assets of the enterprise, the output risk level, output cost of risk and output probability of risk for the predetermined occurrence repeatably determined given same first output data, the second output data and the third output data.

8. The computer-implemented method for performing TRA, IGIR according to claim 7, wherein the method is performed for multiple security domains, multiple assets and multiple output risk levels, output costs of risk and output probabilities of risk for a same enterprise.

9. The computer-implemented method for performing TRA, IGIR according to claim 8, wherein the method is performed at intervals for the multiple assets and the multiple the output risk levels, output costs of risk and output probabilities of risk for a same enterprise.

10. The computer-implemented method for performing TRA, IGIR according to claim 7, wherein the predetermined occurrence is an actual occurrence.

11. The computer-implemented method for performing TRA, IGIR according to claim 10, further comprising updating at least one of the first data, the second data, and the third data in response to the actual occurrence.

12. The computer-implemented method for performing TRA, IGIR according to claim 10, wherein at least some of the first data, the second data and the third data comprises relational data and further comprising:

comparing the at least some of the first data, the second data and the third data to a result of an actual occurrence to produce comparison results;

updating the at least some of the first data, the second data and the third data in response to the comparison results; and storing the updated the at least some of the first data, the second data and the third data.

13. The computer-implemented method for performing TRA, IGIR according to claim 7, wherein the output risk level relates to assets within the enterprise.

14. The computer-implemented method for performing TRA, IGIR according to claim 7, wherein the output risk level relates to assets interacting from within the enterprise with another enterprise.

15. The computer-implemented method for performing TRA, IGIR according to claim 7, wherein:

the second data relates to current security environment, current security controls, and security policies; and a same asset has at least one different current security environment, current security controls, and security policy within a different security domain of use.

16. The computer-implemented method for performing TRA, IGIR according to claim 15, wherein the different security domain of use comprises a data retention security domain.

17. The computer-implemented method for performing TRA, IGIR according to claim 7, further comprising:

accessing reported data relating to known assets, occurrences and outcomes, the reported data reported in relation to a second enterprise other than the enterprise;

determining a relevance to the first data and the second data of the reported data to produce determination data; and updating at least one of the first data and the second data in response to the determination data.

18. The computer-implemented method for performing TRA, IGIR according to claim 7, wherein the third output data comprises data relating to a cost of harm to a first asset and a cost of harm to a second other asset in response to harm to the first asset.

19. The computer-implemented method for performing TRA, IGIR according to claim 7, further comprising:

providing a user interface module allowing a user to request, in respect of one or more activities of an enterprise incorporating at least one of the assets, a threat risk assessment and analysis (TRA); and providing to the user from the user interface module information relating to at least one of threat reporting and security response in respect of one or more security attacks against the at least one of the assets.

20. The computer-implemented method for performing TRA, IGIR according to claim 7, further comprising:

accessing at least some of the first data, the second data and the third data stored within one or more remote servers; and retrieving fourth data relating to at least one of threat reporting and security responses in respect of a security attack against at least one of electronic devices and communications networks of at least one second enterprise other than the enterprise.

21. The computer-implemented method for performing TRA, IGIR according to claim 7, further comprising:

encrypting the first data, the second data, and the third data prior to storage thereof, wherein accessing the first data comprises accessing the encrypted first data and decrypting the encrypted first data to provide the first data, wherein accessing the second data comprises accessing the encrypted second data and decrypting the encrypted second data to provide the second data;

wherein accessing the third data comprises accessing the encrypted third data and decrypting the encrypted third data to provide the third data; and wherein the first data, the second data and the third data each are assets.

22. The computer-implemented method for performing TRA, IGIR according to claim 7, further comprising:

accessing from external sources fourth data comprising client incident data relating to cyber threats;

analyzing in real-time the fourth data in dependence upon at least the first data and the second data to generate compounded cyber threat intelligence data and sector and platform-specific cyber threats associated with the external sources; and notifying predetermined individuals within the enterprise relating to the security domain and platform-specific cyber threats to support collaboration in a response thereto.

23. The computer-implemented method for performing TRA, GIR according to claim 7, wherein the first data and the second data relate to at least one enterprise security domain.

24. The computer-implemented method for performing TRA, IGIR according to claim 7, further comprising:

accessing data relating to a first data asset to determine other assets that have accessed the first data asset and automatically updating the second data relating to the first asset and to the assets that have accessed the first data.

25. The computer-implemented method for performing TRA, according to claim 7, further comprising:

mapping, using an adaptive risk analysis engine, a risk indicator pattern wherein the adaptive risk analysis engine dynamically relies upon a risk ontology to determine a risk factor;

assessing a level of risk based on the risk factor;

constructing impact, internal threat, and external threat parameters in relation to the risk factor;

determining, based upon said threat parameters, whether reporting conditions have been met; and when reporting conditions have been met producing a risk assessment report and notifying at least an individual of the risk assessment report.

26. The computer-implemented method for performing TRA, IGIR according to claim 7 comprising:

providing recommendations for remediation of a residual risk, a mitigation organized by cost and percentage mitigation, the mitigation related to a security domain and the cost and percentage reported across security domains.

27. The computer-implemented method for performing TRA, according to claim 7, further comprising:

storing the third data for later retrieval;

accessing previously stored third output data;

accessing different previously stored third output data;

comparing the previously stored third output data with the different previously stored third output data to determine difference data, the difference data different for different security domains.

* * * * *

UNITED STATES PATENT AND TRADEMARK OFFICE
CERTIFICATE OF CORRECTION

PATENT NO. : 10,708,291 B2  
APPLICATION NO. : 15/609599  
DATED : July 7, 2020  
INVENTOR(S) : Valarie Ann Findlay Page 1 of 1

It is certified that error appears in the above-identified patent and that said Letters Patent is hereby corrected as shown below:

On the Title Page

Item (73) Assignee: Remove "Valarie Ann Findlay, Woodland (CA)".

Signed and Sealed this  
Eighth Day of November, 2022

Katherine Kelly Vidal  
*Director of the United States Patent and Trademark Office*